(12) United States Patent
Hanabusa et al.

(10) Patent No.: US 10,811,186 B2
(45) Date of Patent: Oct. 20, 2020

(54) MAGNETIC COUPLING DEVICE AND WIRELESS POWER TRANSMISSION SYSTEM USING THE SAME

(71) Applicant: TDK CORPORATION, Tokyo (JP)

(72) Inventors: Kazuyoshi Hanabusa, Tokyo (JP); Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 215 days.

(21) Appl. No.: 15/935,361

(22) Filed: Mar. 26, 2018

(65) Prior Publication Data

US 2018/0286578 A1    Oct. 4, 2018

(30) Foreign Application Priority Data

Mar. 31, 2017  (JP) ................................ 2017-069953

(51) Int. Cl.

| | |
|---|---|
| *H01F 38/14* | (2006.01) |
| *H02J 50/10* | (2016.01) |
| *H01F 27/36* | (2006.01) |
| *H01F 27/28* | (2006.01) |
| *H01F 27/38* | (2006.01) |
| *H01F 3/10* | (2006.01) |

(52) U.S. Cl.

CPC ............. *H01F 38/14* (2013.01); *H01F 3/10* (2013.01); *H01F 27/2885* (2013.01); *H01F 27/365* (2013.01); *H01F 27/38* (2013.01); *H02J 50/10* (2016.02); *H01F 27/2804* (2013.01); *H01F 27/2823* (2013.01); *H02J 2207/10* (2020.01)

(58) Field of Classification Search

CPC ........ H01F 3/10; H01F 27/2804; H01F 27/38; H01F 38/14; H01F 27/365; H01F 27/2885; H01F 27/2823; H02J 2007/0095; H02J 50/10

See application file for complete search history.

(56) References Cited

U.S. PATENT DOCUMENTS

| | | | |
|---|---|---|---|
| 9,270,138 B2* | 2/2016 | Yamakawa | H01M 10/44 |
| 9,973,026 B2* | 5/2018 | Bae | H02J 50/10 |
| 2010/0181842 A1 | 7/2010 | Suzuki et al. | |
| 2011/0018360 A1* | 1/2011 | Baarman | H02J 7/0027 |
| | | | 307/104 |
| 2011/0208019 A1 | 8/2011 | Sato et al. | |

(Continued)

FOREIGN PATENT DOCUMENTS

| | | |
|---|---|---|
| JP | 07-52617 A | 2/1995 |
| JP | 01-212416 A | 8/1998 |

(Continued)

*Primary Examiner* — Alfonso Perez Borroto
*Assistant Examiner* — Esayas G Yeshaw
(74) *Attorney, Agent, or Firm* — Young Law Firm, P.C.

(57) ABSTRACT

Disclosed herein is a magnetic coupling device that includes first and second coil units that transmit power or signals with each other by wireless. Each of the first and second coil units includes a first coil and a second coil. The first coil of the first coil unit and the first coil of the second coil unit are magnetically coupled to each other. The second coil of the first coil unit and the second coil of the second coil unit are magnetically coupled to each other. At least one of the first and second coil units has an electromagnetic shielding member disposed at a position preventing magnetic coupling between the first and second coils.

33 Claims, 16 Drawing Sheets

(56) References Cited

U.S. PATENT DOCUMENTS

| | | |
|---|---|---|
| 2014/0375262 A1 | 12/2014 | Yamaguchi et al. |
| 2015/0116178 A1 | 4/2015 | Kim et al. |
| 2015/0333530 A1* | 11/2015 | Moyer .................... H02J 5/005 307/104 |
| 2016/0284465 A1* | 9/2016 | Maniktala ................ H01F 38/14 |
| 2017/0018971 A1* | 1/2017 | Oshima ................... H02J 50/10 |
| 2017/0237293 A1* | 8/2017 | Faraone .................. H02J 50/90 713/300 |

FOREIGN PATENT DOCUMENTS

| | | |
|---|---|---|
| JP | 2010-147420 A | 7/2010 |
| JP | 2011-003947 A | 1/2011 |
| JP | 2013-169122 A | 8/2013 |
| JP | 2014-49479 A | 3/2014 |
| JP | 2014-183469 A | 9/2014 |
| JP | 2017-63536 A | 3/2017 |
| KR | 10-215-0051922 A | 5/2015 |

* cited by examiner

MAGNETIC COUPLING DEVICE AND WIRELESS POWER TRANSMISSION SYSTEM USING THE SAME

BACKGROUND OF THE INVENTION

Field of the Invention

The present invention relates to a magnetic coupling device that transmits power and signals by wireless and a wireless power transmission system using the magnetic coupling device.

Description of Related Art

A wireless power transmission technology of transmitting power without the use of a power cable or a power cord is now attracting attention. The wireless power transmission technology enables power to be supplied from a power transmission side to a power receiving side by wireless, and is thus expected to be applied to various products such as transport equipment (electric trains, electric cars), home electric appliances, electronic devices, wireless communication devices, toys, and industrial equipment.

For example, in wireless power transmission, a current is made to flow in a power transmitting coil to generate a magnetic flux, which interlinks a power receiving coil to cause the power receiving coil to generate a voltage, thereby transmitting power. Energy received by the power receiving coil is then supplied to a load. In most cases, the load requires stable supply of power, voltage or current, irrespective of its kind. Thus, it is required to perform control so as to make supply of power, voltage, or current constant.

To realize such control, it is necessary to transmit a control signal from a power receiving side to a power transmitting side. For example, the control signal can be transmitted using magnetic field coupling. In the magnetic field coupling, a magnetic flux is generated in a power receiving side signal transmitting coil, and the generated magnetic flux is made to interlink a power transmitting side signal receiving coil to generate a voltage, thereby transmitting a signal. However, a magnetic flux for power transmission is also generated at this time. If this magnetic flux interlinks the signal receiving coil, the above control may fail.

Under such circumstances, it is required to realize a magnetic field coupling method not affected by the magnetic flux for power transmission. For example, JP 2011-003947A proposes a magnetic field coupling type signal transmitting/receiving coil structure less subject to the magnetic flux for power transmission. This structure is achieved by making a direction Hp of magnetic field generated by a power transmitting coil orthogonal to a direction Hs of a magnetic field received by a signal transmitting coil.

Further, JP 2013-169122A proposes a coil device including a power transmitting coil and an NFC (Near Field Communication) coil. In this coil device, a power transmission frequency and an NFC frequency are different from each other, and magnetic materials of the power transmitting coil and NFC coil are selected so as to match the above frequencies, respectively.

However, in the invention disclosed in JP 2011-003947 A, the power transmitting coil and signal transmitting coil are disposed in proximity to each other, and thus the magnetic flux for power transmission may still affect signal transmission, and there is room for improvement.

Further, in the invention disclosed in JP 2013-169122 A, the NFC coil is not operated simultaneously with the power transmitting coil. Thus, influence that the magnetic flux during transmission of power has on the signal transmission is not considered and, hence, there is still room for improvement under the consideration of such influence.

SUMMARY

The present invention has been made in view of the above problems, and the object thereof is to provide a magnetic coupling device capable of establishing signal transmission with minimum influence of a magnetic flux for power transmission and a wireless power transmission system using the magnetic coupling device.

To solve the above problems, a magnetic coupling device according to the present invention includes first and second coil units that transmit power or signals with each other by wireless, wherein each of the first and second coil units includes a first coil and a second coil, wherein the first coil of the first coil unit and the first coil of the second coil unit are magnetically coupled to each other, wherein the second coil of the first coil unit and the second coil of the second coil unit are magnetically coupled to each other, and wherein at least one of the first and second coil units has an electromagnetic shielding member disposed at a position preventing magnetic coupling between the first and second coils.

A wireless power transmission system according to the present invention includes: a magnetic coupling device includes a power transmitting coil and a power receiving coil magnetically coupled to each other, a signal transmitting coil and a signal receiving coil magnetically coupled to each other, and an electromagnetic shielding member disposed at a position preventing magnetic coupling between power transmitting and receiving coils and signal transmitting and receiving coils; a power transmitting circuit that converts an input DC voltage into an AC voltage and outputs the AC voltage to the power transmitting coil; a control circuit that controls the AC voltage output from the power transmitting circuit based on the AC signal received by the signal receiving coil; a power receiving circuit that converts the AC voltage generated in the power receiving coil into a DC voltage; and a signal generating circuit that generates an AC signal indicating the magnitude of the output voltage or output current from the power receiving circuit.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
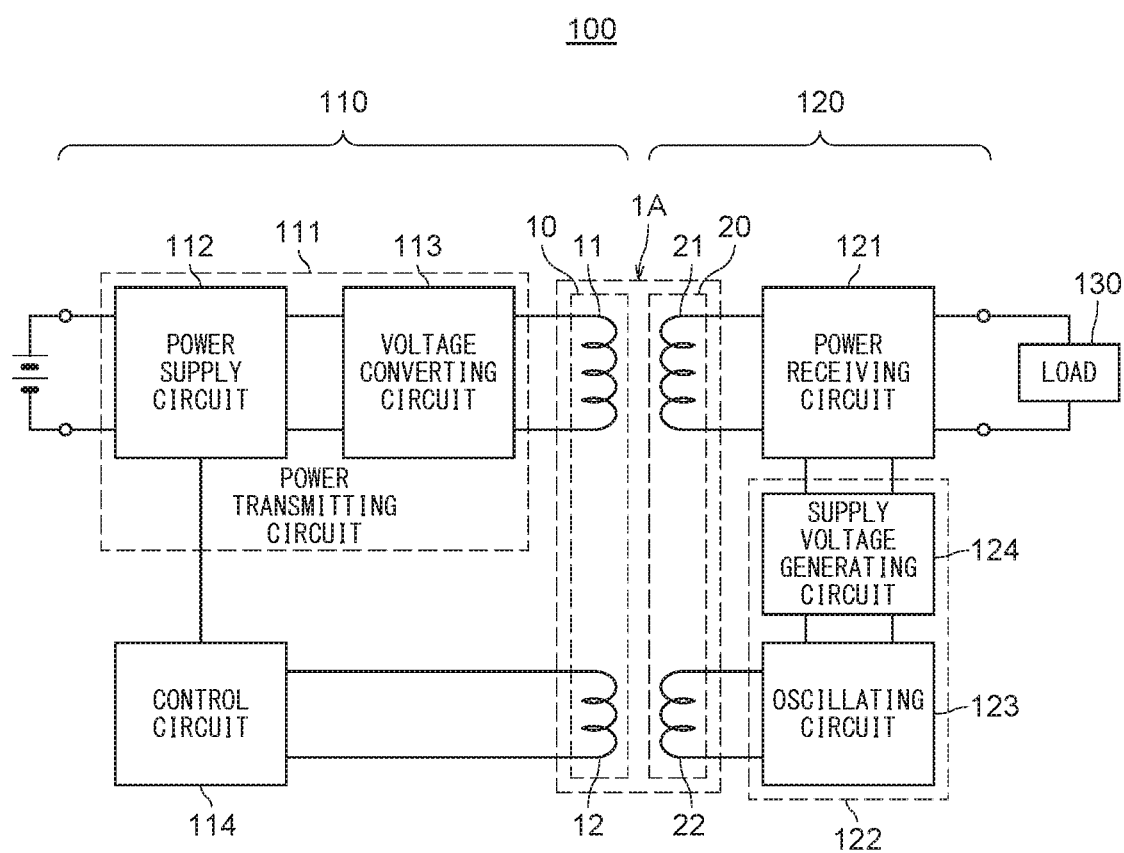
FIG. 1 is a circuit diagram of a wireless power transmission system according to a preferred embodiment of the present invention.

FIG. 1 is a circuit diagram of a wireless power transmission system according to a preferred embodiment of the present invention.

As illustrated in FIG. 1, a wireless power transmission system 100 includes a combination of a wireless power transmitting device 110 and a wireless power receiving device 120 and is configured to transmit power from the wireless power transmitting device 110 to the wireless power receiving device 120 by wireless.

The wireless power transmitting device 110 has a power transmitting circuit 111 that converts an input DC voltage into an AC voltage of, e.g., 100 kHz and outputs the AC voltage, a power transmitting coil 11 applied with the AC voltage to generate an AC magnetic flux, a signal receiving coil 12 that receives an AC signal transmitted from the wireless power receiving device 120, and a control circuit 114 that controls the AC voltage output from the power transmitting circuit 111 based on the AC signal received by the signal receiving coil 12.

The power transmitting circuit 111 has a power supply circuit 112 that converts an input DC voltage into a predetermined DC voltage and a voltage converting circuit 113 that converts the predetermined DC voltage output from the power supply circuit 112 into an AC voltage of, e.g., 100 kHz. Based on the AC signal received by signal receiving coil 12, the control circuit 114 controls the magnitude of the predetermined DC voltage output from the power supply circuit 112 to thereby control the AC voltage output from the power transmitting circuit 111.

The wireless power receiving device 120 has a power receiving coil 21 that receives at least a part of the AC magnetic flux generated by the power transmitting coil 11 to generate an AC voltage, a power receiving circuit 121 that converts the AC voltage generated in the power receiving coil 21 into a DC voltage, a signal generating circuit 122 that generates an AC signal indicating the magnitude of the output voltage or output current from the power receiving circuit 121, and a signal transmitting coil 22 that transmits the AC signal to the signal receiving coil 12. The output voltage from the power receiving circuit 121 is supplied to, e.g., a load 130.

The signal generating circuit 122 has an oscillating circuit 123 that outputs an AC signal of, e.g., 10 MHz and a supply voltage generating circuit 124 that generates a supply voltage for the oscillating circuit 123 in accordance with the magnitude of the output voltage or output current from the power receiving circuit 121. The supply voltage generating circuit 124 controls the supply voltage for the oscillating circuit 123 based on a difference between the output voltage or output current from the power receiving circuit 121 and a target value.

As described above, signal transmission is performed during power transmission to feed back the output of the wireless power receiving device 120 to the wireless power transmitting device 110, whereby the output of the wireless power receiving device 120 can be controlled to be constant.

In the present embodiment, the frequency of an AC voltage for power transmission is 100 kHz, while the frequency of an AC signal for signal transmission is 10 MHz which is 100 times the frequency of the AC voltage for power transmission. The frequency of the AC signal for signal transmission is preferably 10 times or more the frequency of the AC voltage for power transmission. When the frequency of the AC signal for signal transmission is 10 times or more the frequency of the AC voltage for power transmission, it is possible to prevent the harmonic of the AC voltage for power transmission from becoming noise with respect to an AC signal to thereby prevent an output signal waveform from being significantly distorted. This can avoid interference between the signal transmission and the power transmission, thereby ensuring transmission quality of the AC signal.

In the present embodiment, the power transmitting coil 11, signal receiving coil 12, power receiving coil 21, and signal transmitting coil 22 constitute a magnetic coupling device 1A for transmitting power and signals by wireless. In particular, a combination of the power transmitting coil 11 and the signal receiving coil 12 constitutes a power transmitting side coil unit 10 (first coil unit), and a combination of the power receiving coil 21 and the signal transmitting coil 22 constitutes a power receiving side coil unit 20 (second coil unit). Further, the power transmitting coil 11 and power receiving coil 21 constitute a pair of coils (first coil) magnetically coupled to each other so as to perform power transmission, and the signal transmitting coil 22 and signal receiving coil 12 constitute another pair of coils (second coil) magnetically coupled to each other so as to perform signal transmission.

Figure 2A:
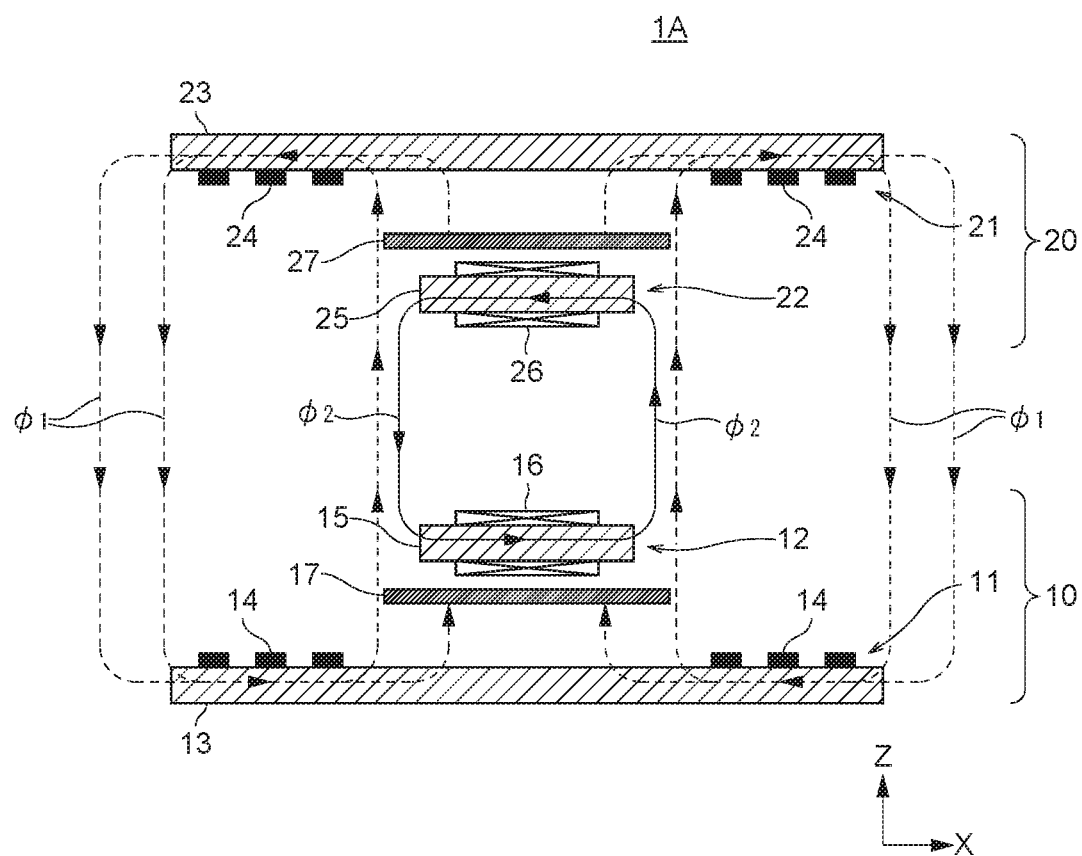
FIG. 2A is a schematic cross-sectional side view illustrating a structure of the magnetic coupling device according to a first embodiment of the present invention.
Figure 2B:
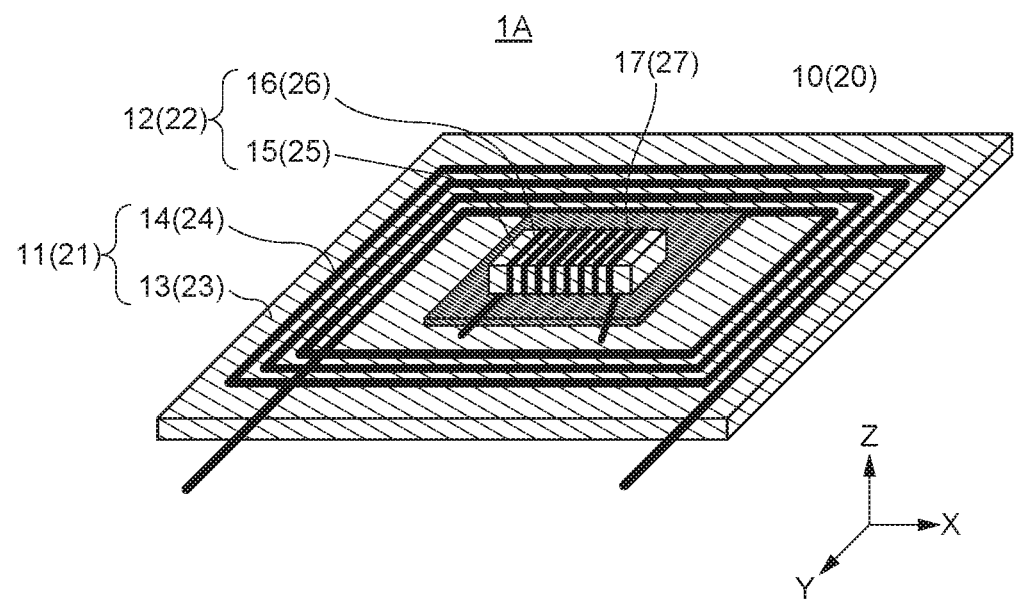
FIG. 2B is a schematic perspective view of a power transmitting side coil unit or a power receiving side coil unit of the first embodiment of the present invention.

FIGS. 2A and 2B are views illustrating the structure of the magnetic coupling device according to the first embodiment of the present invention. FIG. 2A is a schematic cross-sectional side view, and FIG. 2B is a schematic perspective view of the power transmitting side coil unit 10 (and power receiving side coil unit 20).

As illustrated in FIGS. 2A and 2B, the magnetic coupling device 1A has the power transmitting side coil unit 10 including a combination of the power transmitting coil 11 performing power transmission and the signal receiving coil 12 performing signal transmission and the power receiving side coil unit 20 including a combination of the power receiving coil 21 performing power transmission and the signal transmitting coil 22 performing signal transmission, and is configured to transmit power from the power transmitting side coil unit 10 to the power receiving side coil unit 20 by wireless. The power transmitting side coil unit 10 and power receiving side coil unit 20 have substantially the same configuration and are disposed opposite to each other in the Z-axis direction (first direction) in the drawing.

The power transmitting coil 11 is a spiral coil obtained by spirally winding a conducting wire 14 on the main surface of a flat plate-like magnetic core 13 (first magnetic body). The signal receiving coil 12 is a solenoid coil (helical coil) obtained by helically winding a conducting wire 16 around the outer peripheral surface of a magnetic core 15 (second magnetic body). In the present embodiment, the power transmitting coil 11 is disposed such that the coil axis thereof is directed in the Z-axis direction, while the signal receiving coil 12 is disposed such that the coil axis thereof is directed in the X-axis direction (second direction). That is, the power transmitting coil 11 and the signal receiving coil 12 are disposed such that coil axes thereof are substantially orthogonal to each other, whereby the direction of a magnetic flux $\phi_1$ interlinking the power transmitting coil 11 and the direction of a magnetic flux $\phi_2$ interlinking the signal receiving coil 12 are substantially orthogonal to each other.

The power receiving coil 21 is, like the power transmitting coil 11, a spiral coil obtained by spirally winding a conducting wire 24 on the main surface of a flat plate-like magnetic core 23 (first magnetic body). The signal transmitting coil 22 is, like the power receiving coil 21, a solenoid coil (helical coil) obtained by helically winding a conducting wire 26 around the outer peripheral surface of a magnetic core 25 (second magnetic body). In the present embodiment, the power receiving coil 21 is disposed such that the coil axis thereof is directed in the Z-axis direction, while the signal transmitting coil 22 is disposed such that the coil axis thereof is directed in the X-axis direction. That is, the power receiving coil 21 and the signal transmitting coil 22 are disposed such that coil axes thereof are substantially orthogonal to each other, whereby the direction of a magnetic flux $\phi_1$ interlinking the power receiving coil 21 and the direction of a magnetic flux $\phi_2$ interlinking the signal transmitting coil 22 are substantially orthogonal to each other.

In the present embodiment, the planar size of the magnetic core 15 (25) is preferably smaller than the planar size of an opening part inside the loop of the power transmitting coil 11 (power receiving coil 21). That is, the signal receiving coil 12 and signal transmitting coil 22 are within the loops of the respective power transmitting coil 11 and power receiving coil 21.

The signal receiving coil 12 and signal transmitting coil 22 that perform signal transmission are disposed within a space sandwiched between the power transmitting coil 11 and the power receiving coil 21 that perform power transmission. A first electromagnetic shielding member 17 is disposed between the power transmitting coil 11 and the signal receiving coil 12, and a second electromagnetic shielding member 27 is disposed between the power receiving coil 21 and the signal transmitting coil 22.

The first electromagnetic shielding member 17 is preferably configured to cover at least a forming area of the conducting wire 16 of the signal receiving coil 12 as viewed in the Z-axis direction which is the coil axis direction of the power transmitting coil 11 and power receiving coil 21, and more preferably to cover the entire magnetic core 15 around which the signal receiving coil 12 is wound. Thus, the first electromagnetic shielding member 17 is disposed at a position that prevents magnetic coupling between the power transmitting coil 11 and the signal receiving coil 12, thereby making it possible to further suppress influence that a magnetic flux for power transmission has on signal transmission.

The second electromagnetic shielding member 27 is preferably configured to cover at least a forming area of the conducting wire 26 of the signal transmitting coil 22 as viewed in the Z-axis direction, and more preferably to cover the entire magnetic core 25 around which the signal transmitting coil 22 is wound. Thus, the second electromagnetic shielding member 27 is also disposed at a position that prevents magnetic coupling between the power receiving coil 21 and the signal transmitting coil 22, thereby making it possible to further suppress influence that the magnetic flux for power transmission has on signal transmission.

The planar size of the first electromagnetic shielding member 17 (second electromagnetic shielding member 27) is preferably smaller than the planar size of an opening part inside the loop of the power transmitting coil 11 (power receiving coil 21). That is, the first and second electromagnetic shielding members 17 and 27 are within the loops of the respective power transmitting coil 11 and power receiving coil 21.

The first electromagnetic shielding member 17 is preferably disposed closer to the signal receiving coil 12 than to the power transmitting coil 11, and the second electromagnetic shielding member 27 is preferably disposed closer to the signal transmitting coil 22 than to the power receiving coil 21. By disposing the electromagnetic shielding member as close as possible to the coil that performs signal transmission, it is possible to further suppress influence that the magnetic flux for power transmission has on signal transmission while suppressing a reduction in power transmission efficiency.

As denoted by the dashed arrow of FIG. 2A, the magnetic flux $\phi_1$ generated from the power transmitting coil 11 travels upward in the Z-axis direction from the inside of the loop of the power transmitting coil 11 and passes inside the loop of the power receiving coil 21 to interlink the power receiving coil 21. Thereafter, the magnetic flux $\phi_1$ travels toward the outside of the loop of the power receiving coil 21 while passing inside the magnetic core 23, then travels downward in the Z-axis direction, and returns to the inside of the loop of the power transmitting coil 11 while passing inside the magnetic core 13. In this manner, the power transmitting coil 11 is magnetically coupled to the power receiving coil 21, whereby power can be transmitted from the wireless power transmitting device 110 to the wireless power receiving device 120 by wireless.

As denoted by the solid arrow of FIG. 2A, the magnetic flux $\phi_2$ generated from the signal transmitting coil 22 passes inside the magnetic core 25 penetrating the loop of the signal transmitting coil 22, travels downward in the Z-axis direction, and passes inside the magnetic core 15 penetrating the loop of the signal receiving coil 12 to interlink the signal receiving coil 12. Thereafter, the magnetic flux $\phi_2$ travels upward in the Z-axis direction and returns to the inside of the loop of the signal transmitting coil 22. In this manner, the signal transmitting coil 22 is magnetically coupled to the signal receiving coil 12, whereby signals can be transmitted from the wireless power receiving device 120 to the wireless power transmitting device 110 by wireless.

The magnetic flux $\phi_1$ interlinking the power transmitting coil 11 and the power receiving coil 21 constitutes a large loop. A part of the loop constituted by the magnetic flux $\phi_1$ is shielded by the first and second electromagnetic shielding members 17 and 27 and cannot enter a space sandwiched between the first and second electromagnetic shielding members 17 and 27. That is, a part of the magnetic flux $\phi_1$ generated from the power transmitting coil 11 and traveling toward the power receiving side coil unit 20 is shielded by the first and second electromagnetic shielding members 17 and 27. Specifically, an eddy current is generated when a part of the magnetic flux $\phi_1$ interlinks the first and second electromagnetic shielding members 17 and 27, and a magnetic flux generated by the eddy current and a part of the magnetic flux $\phi_1$ cancel each other.

The magnetic flux $\phi_2$ interlinking the signal transmitting coil 22 and the signal receiving coil 12 constitutes a small loop within a space sandwiched between the first and second electromagnetic shielding members 17 and 27 and is thus hardly influenced by the magnetic flux $\phi_1$. Thus, it is possible to improve signal quality by suppressing influence that the magnetic flux $\phi_1$ for power transmission has on the magnetic flux $\phi_2$ for signal transmission.

As described above, the wireless power transmission system 100 has the magnetic coupling device 1A for transmitting power and signals by wireless. The magnetic coupling device 1A has the power transmitting side coil unit 10 including a combination of the power transmitting coil 11 and the signal receiving coil 12 and the power receiving side coil unit 20 including a combination of the power receiving coil 21 and the signal transmitting coil 22. The power transmitting side coil unit 10 has the first electromagnetic shielding member 17 disposed at a position preventing magnetic coupling between the power transmitting coil 11 and the signal receiving coil 12, and the power receiving side coil unit 20 has the second electromagnetic shielding member disposed at a position preventing magnetic coupling between the power receiving coil 21 and the signal transmitting coil 22. With the above configuration, it is possible to establish signal transmission with minimum influence of the magnetic flux for power transmission, thereby enhancing performance of the wireless power transmission system 100.

Figure 3A:
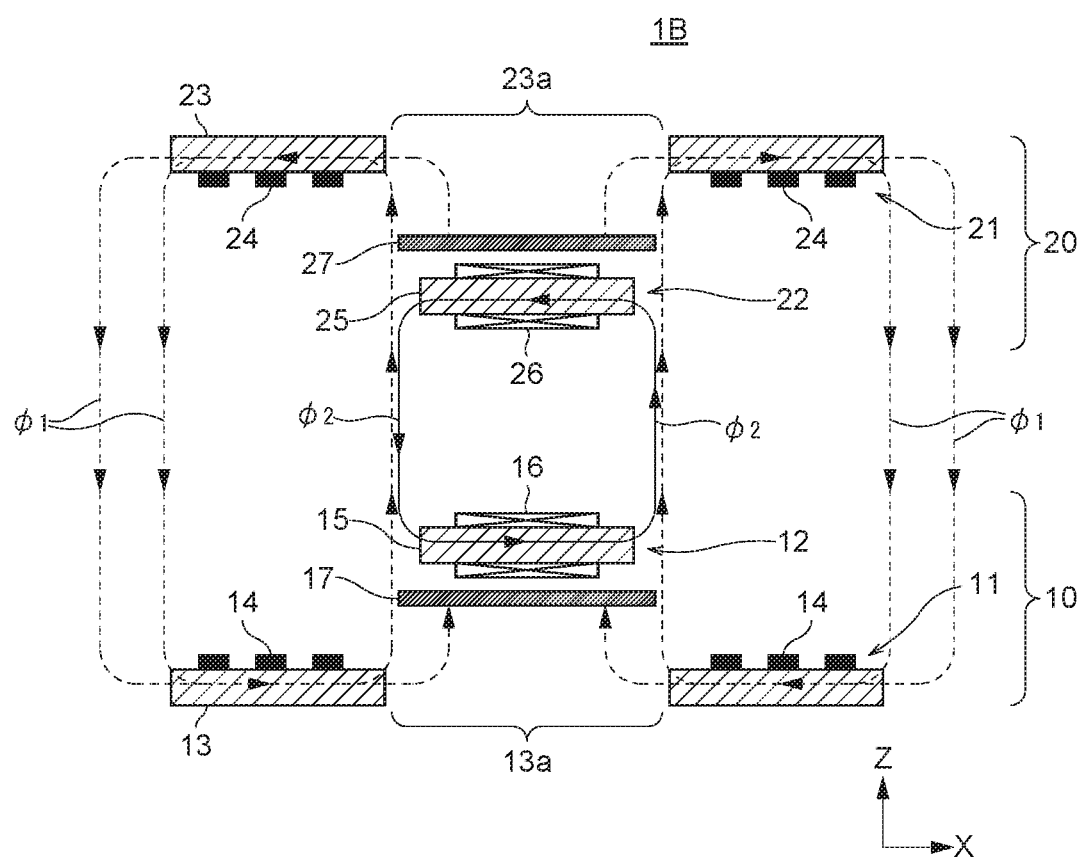
FIG. 3A is a schematic cross-sectional side view illustrating a structure of the magnetic coupling device according to a second embodiment of the present invention.
Figure 3B:
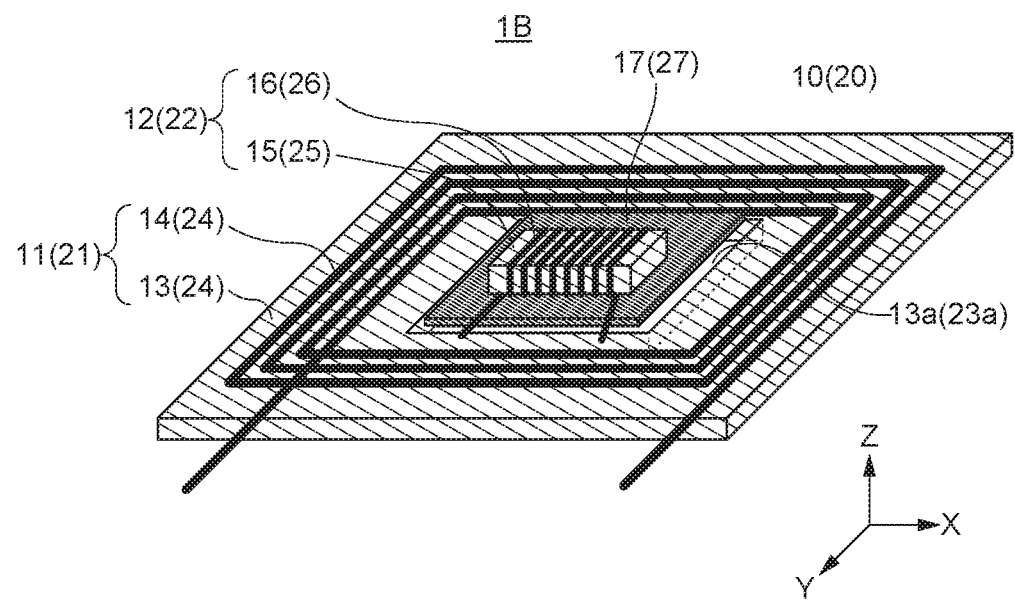
FIG. 3B is a schematic perspective view of a power transmitting side coil unit or a power receiving side coil unit of the second embodiment of the present invention.

FIGS. 3A and 3B are views illustrating the structure of a magnetic coupling device according to the second embodiment of the present invention. FIG. 3A is a schematic cross-sectional side view, and FIG. 3B is a schematic perspective view of the power transmitting side coil unit 10 (and power receiving side coil unit 20).

As illustrated in FIGS. 3A and 3B, a magnetic coupling device 1B of the present embodiment is featured in that a through hole 13a is formed at the center portion of the magnetic core 13 surrounded by the loop of the conducting wire 14 of the power transmitting coil 11 and that a through hole 23a is formed at the center portion of the magnetic core 23 surrounded by the loop of the conducting wire 24 of the power receiving coil 21. Other configurations are the same as those of the first embodiment.

The planar size of the through hole 13a of the magnetic core 13 is preferably larger than that of the magnetic core 15 of the signal receiving coil 12, and the planar size of the through hole 23a of the magnetic core 23 is preferably larger than that of the magnetic core 25 of the signal transmitting coil 22. Further, the planar sizes of the through holes 13a and 23a are preferably larger than those of the first and second electromagnetic shielding members 17 and 27.

As described above, the wireless power transmission system 100 having the magnetic coupling device 1B according to the present embodiment can provide the same effects as those of the first embodiment. Further, it is possible not only to reduce the cost required for manufacturing the magnetic cores 13 and 23 but also to reduce the thicknesses of the coil units through insertion of the signal receiving coil 12 and the signal transmitting coil 22 into the through holes 13a and 23a, respectively.

Figure 4A:
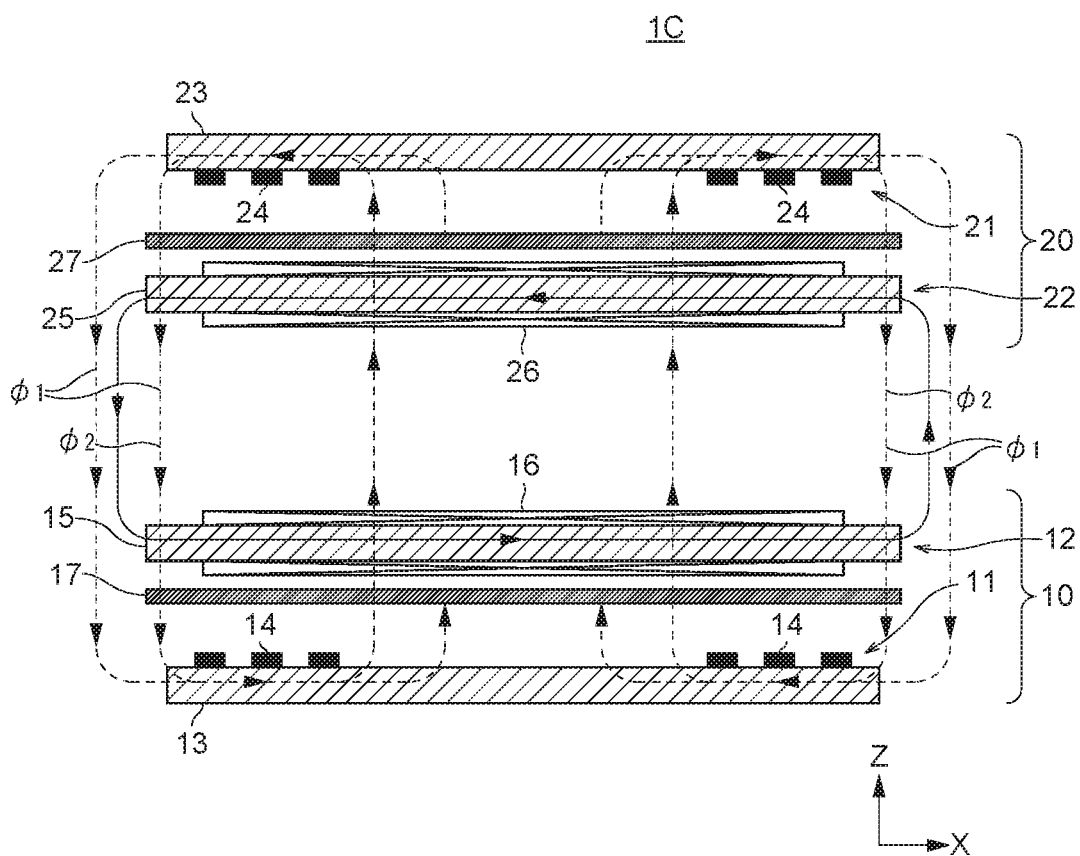
FIG. 4A is a schematic cross-sectional side view illustrating a structure of the magnetic coupling device according to a third embodiment of the present invention.
Figure 4B:
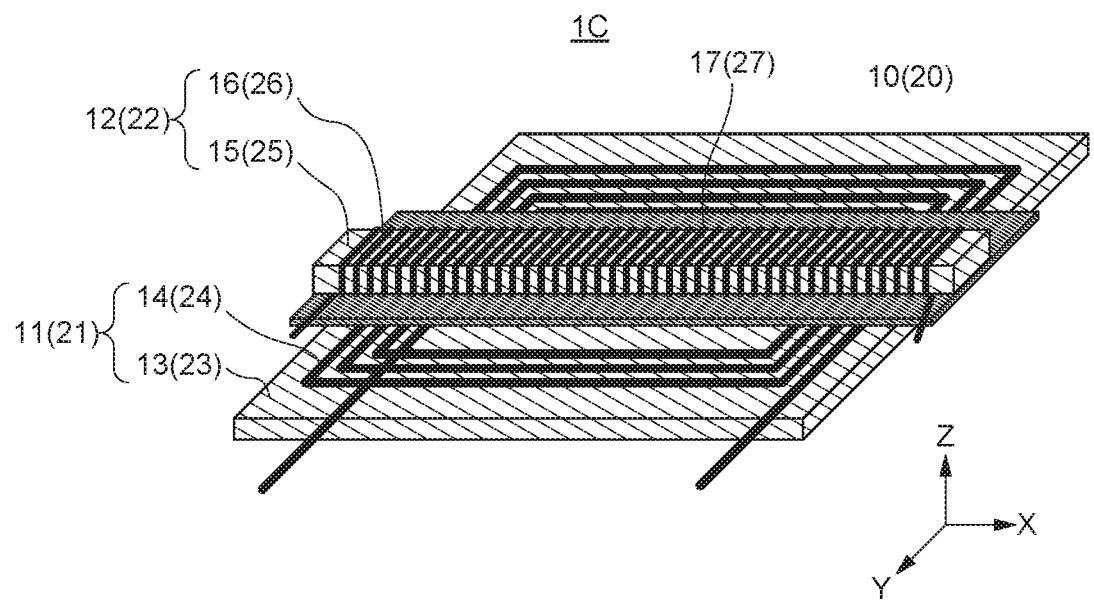
FIG. 4B is a schematic perspective view of a power transmitting side coil unit or a power receiving side coil unit of the third embodiment of the present invention.

FIGS. 4A and 4B are views illustrating the structure of a magnetic coupling device according to the third embodiment of the present invention. FIG. 4A is a schematic cross-sectional side view, and FIG. 4B is a schematic perspective view of the power transmitting side coil unit 10 (and power receiving side coil unit 20).

As illustrated in FIGS. 4A and 4B, a magnetic coupling device 1C of the present embodiment is featured in that the size of the signal receiving coil 12 in the X-axis direction is larger than the size of the opening part of the power transmitting coil 11 in the X-axis direction and that the size of the signal transmitting coil 22 in the X-axis direction is larger than the size of the opening part of the power receiving coil 21 in the X-axis direction. Other configurations are the same as those of the first embodiment.

The size of the signal receiving coil 12 in the Y-axis direction is preferably smaller than the size of the opening part of the power transmitting coil 11 in the Y-axis direction, and the size of the signal transmitting coil 22 in the Y-axis direction is preferably smaller than the size of the opening part of the power receiving coil 21 in the Y-axis direction. The sizes of the magnetic cores 15 and 25 in the X-axis direction are preferably larger than the sizes of the magnetic cores 13 and 23 in the X-axis direction, and the sizes of the magnetic cores 15 and 25 in the Y-axis direction are preferably smaller than the sizes of the opening parts of the power transmitting coil 11 and power receiving coil 21 in the Y-axis direction.

The first electromagnetic shielding member 17 is disposed between the power transmitting coil 11 and the signal receiving coil 12, and the second electromagnetic shielding member 27 is disposed between the power receiving coil 21 and the signal transmitting coil 22. The first electromagnetic shielding member 17 is preferably configured to cover at least a forming area of the conducting wire 16 of the signal receiving coil 12 as viewed in the Z-axis direction which is the coil axis direction of the power transmitting coil 11 and power receiving coil 21, and more preferably to cover the entire magnetic core 15 around which the signal receiving coil 12 is wound. Further, the second electromagnetic shielding member 27 is preferably configured to cover at least a forming area of the conducting wire 26 of the signal transmitting coil 22 as viewed in the Z-axis direction, and more preferably to cover the entire magnetic core 25 around which the signal transmitting coil 22 is wound.

The magnetic flux $\phi_1$ generated from the power transmitting coil 11 passes an area not overlapping the first and second electromagnetic shielding members 17 and 27 in a plan view and then passes inside the loop of the power receiving coil 21 to interlink the power receiving coil 21. However, a part of the magnetic flux $\phi_1$ is shielded by the first and second electromagnetic shielding members 17 and 27 and thus cannot enter a space sandwiched between the first and second electromagnetic shielding members 17 and 27. That is, a part of the magnetic flux $\phi_1$ generated from the power transmitting coil 11 and traveling toward the signal receiving coil 12 or signal transmitting coil 22 is shielded by the first and second electromagnetic shielding members 17 and 27. Thus, it is possible to improve signal quality by suppressing influence that the magnetic flux $\phi_1$ for power transmission has on the magnetic flux $\phi_2$ for signal transmission.

As described above, the wireless power transmission system 100 having the magnetic coupling device 1C according to the present embodiment can provide the same effects as those of the first embodiment. Further, it is possible to increase the numbers of turns of the signal transmitting coil 22 and signal receiving coil 12 to enhance the degree of magnetic coupling between the signal transmitting coil 22 and the signal receiving coil 12, thereby improving signal transmission efficiency.

Figure 5:
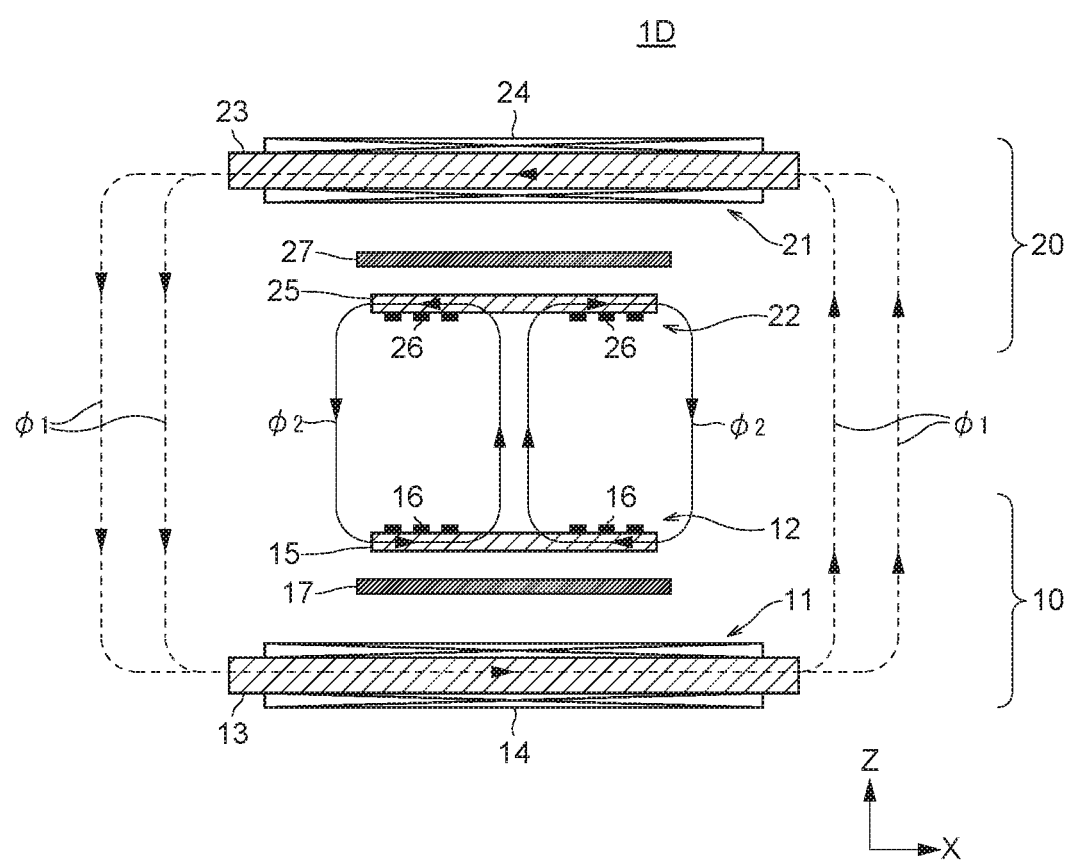
FIG. 5 is a schematic cross-sectional view illustrating the structure of a magnetic coupling device according to a fourth embodiment of the present invention.

FIG. 5 is a schematic cross-sectional view illustrating the structure of a magnetic coupling device according to the fourth embodiment of the present invention.

As illustrated in FIG. 5, a magnetic coupling device 1D of the present embodiment is featured in that the power transmitting coil 11 and power receiving coil 21 are each a helically-wound solenoid coil and that the signal receiving coil 12 and signal transmitting coil 22 are each a spirally-wound spiral coil. That is, the types of the coils for power transmission and signal transmission are reversed to those in the first embodiment. Other configurations are the same as those of the first embodiment.

The planar sizes of the signal transmitting coil 22 and signal receiving coil 12 are smaller than the planar sizes of the power transmitting coil 11 and power receiving coil 21. Thus, the magnetic flux $\phi_2$ interlinking the signal transmitting coil 22 and the signal receiving coil 12 forms a small loop circulating within a space sandwiched between the power transmitting coil 11 and the power receiving coil 21. On the other hand, the magnetic flux $\phi_1$ interlinking the power transmitting coil 11 and the power receiving coil 21 forms a large loop circulating outside the signal transmitting coil 22 and signal receiving coil 12.

In the present embodiment as well, the first electromagnetic shielding member 17 is disposed between the power transmitting coil 11 and the signal receiving coil 12, and the second electromagnetic shielding member 27 is disposed between the power receiving coil 21 and the signal transmitting coil 22, so that the same effects as those of the first embodiment can be obtained. That is, it is possible to improve signal quality by suppressing influence that the magnetic flux $\phi_1$ for power transmission has on the magnetic flux $\phi_2$ for signal transmission, thereby enhancing performance of the wireless power transmission system 100.

Figure 6:
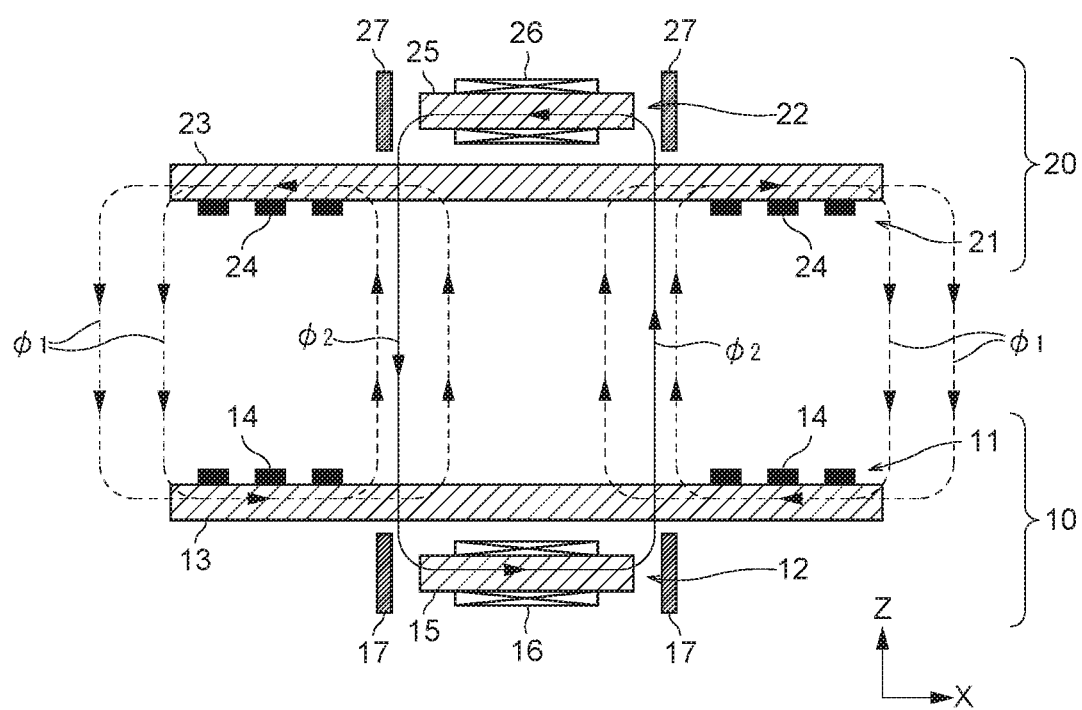
FIG. 6 is a schematic cross-sectional view illustrating the structure of a magnetic coupling device according to a fifth embodiment of the present invention.

FIG. 6 is a schematic cross-sectional view illustrating the structure of a magnetic coupling device according to the fifth embodiment of the present invention.

As illustrated in FIG. 6, a magnetic coupling device 1E of the present embodiment is featured in that the signal transmitting coil 22 and signal receiving coil 12 constituting a transformer for signal transmission are provided outside a space sandwiched between the power transmitting coil 11 and the power receiving coil 21 constituting a transformer for power transmission and that the power transmitting coil 11 and the power receiving coil 21 are sandwiched between the signal transmitting coil 22 and the signal receiving coil 12. Thus, the magnetic flux $\phi_2$ generated from the signal transmitting coil 22 passes inside the loops of the power receiving coil 21 and power transmitting coil 11 and penetrates the magnetic cores 13 and 23 to interlink the signal receiving coil 12, whereby the signal transmitting coil 22 and the signal receiving coil 12 are magnetically coupled to each other.

The first electromagnetic shielding member 17 is not disposed within a space sandwiched between the power transmitting coil 11 and the signal receiving coil 12 but is configured to cover the periphery of the signal receiving coil 12 as viewed in the Z-axis direction. However, the first electromagnetic shielding member 17 need not surround the entire periphery of the signal receiving coil 12 but may cover only both sides of the signal receiving coil 12 in the coil axis direction thereof (X-axis direction).

Similarly, the second electromagnetic shielding member 27 is not disposed within a space sandwiched between the power receiving coil 21 and the signal transmitting coil 22 but is configured to cover the periphery of the signal transmitting coil 22 as viewed in the Z-axis direction. However, the second electromagnetic shielding member 27 need not surround the entire periphery of the signal transmitting coil 22 but may cover only both sides of the signal transmitting coil 22 in the coil axis direction thereof (X-axis direction).

As described above, the main surfaces of the first and second electromagnetic shielding members 17 and 27 are orthogonal to the coil axis direction (travel direction of the magnetic flux $\phi_2$) of their corresponding coils for signal transmission, so that it is possible to reliably magnetically couple the signal transmitting coil 22 and the signal receiving coil 12 by the loop of the magnetic flux $\phi_2$ while preventing magnetic coupling between the coil for signal transmission and the coil for power transmission.

Figure 7:
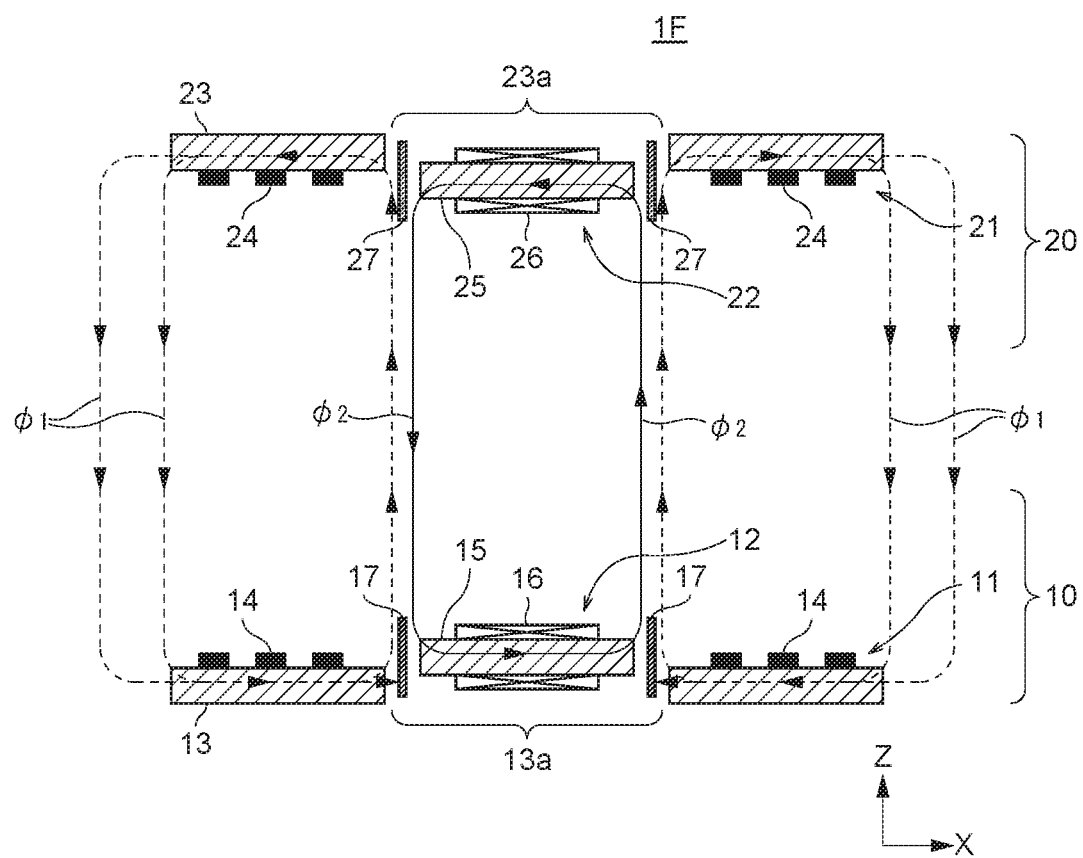
FIG. 7 is a schematic cross-sectional view illustrating the structure of a magnetic coupling device according to a sixth embodiment of the present invention.

FIG. 7 is a schematic cross-sectional view illustrating the structure of a magnetic coupling device according to the sixth embodiment of the present invention.

As illustrated in FIG. 7, a magnetic coupling device 1F of the present embodiment is a modification of the magnetic coupling device 1B according to the second embodiment (FIGS. 3A and 3B) and is featured in that a part of the signal receiving coil 12 in the power transmitting side coil unit 10 is within the through hole 13a of the magnetic core 13 and that a part of the signal transmitting coil 22 in the power receiving side coil unit 20 is within the through hole 23a of the magnetic core 23. Further, the first electromagnetic shielding member 17 is provided around the signal receiving coil 12 as viewed in the Z-axis direction, and the second electromagnetic shielding member 27 is provided around the signal transmitting coil 22 as viewed in the Z-axis direction.

The signal receiving coil 12 is disposed within the through hole 13a of the magnetic core 13 in a plan view, and the magnetic core 13 and the magnetic core 15 are not disposed on the same plane, but the magnetic core 15 is disposed slightly inward from the magnetic core 13. Similarly, the signal transmitting coil 22 is disposed within the through hole 23a of the magnetic core 23 in a plan view, and the magnetic core 23 and the magnetic core 25 are not disposed on the same plane, but the magnetic core 25 is disposed slightly inward from the magnetic core 23. With this configuration, it is possible to improve signal quality by suppressing influence that the magnetic flux $\phi_1$ for power transmission has on the magnetic flux $\phi_2$ for signal transmission.

In the present embodiment as well, the main surface of the first electromagnetic shielding member 17 is orthogonal to the coil axis direction of its corresponding coil for signal transmission to cover the travel direction of the magnetic flux interlinking the coil for signal transmission, so that it is possible to reliably magnetically couple the signal transmitting coil 22 and signal receiving coil 12 by the loop of the magnetic flux $\phi_2$ while preventing magnetic coupling between the coil for signal transmission and the coil for power transmission, in the power transmitting side coil unit 10 and the power receiving side coil unit 20.

Figure 8:
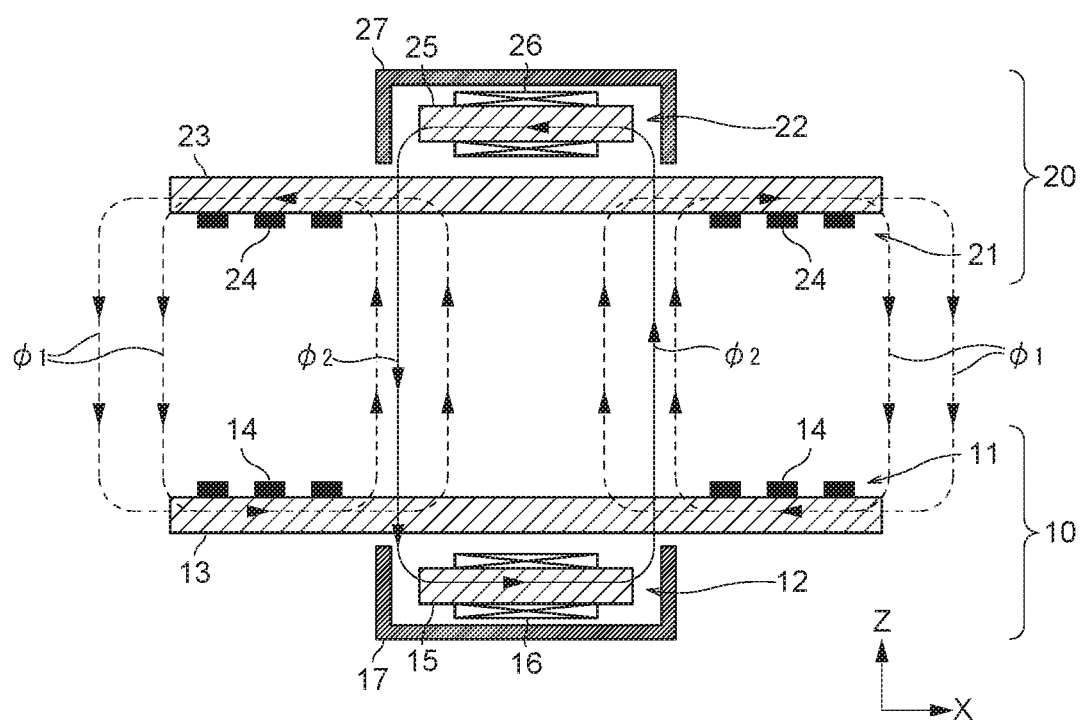
FIG. 8 is a schematic cross-sectional view illustrating the structure of a magnetic coupling device according to a seventh embodiment of the present invention.

FIG. 8 is a schematic cross-sectional view illustrating the structure of a magnetic coupling device according to the seventh embodiment of the present invention.

As illustrated in FIG. 8, a magnetic coupling device 1G of the present embodiment is a modification of the magnetic coupling device 1E according to the fifth embodiment (FIG. 6) and is featured in that the first electromagnetic shielding member 17 covers not only the periphery of the signal receiving coil 12 as viewed in the Z-axis direction but also the outside thereof in the Z-axis direction and that the second electromagnetic shielding member 27 covers not only the periphery of the signal transmitting coil 22 as viewed in the Z-axis direction but also the outside thereof in the Z-axis direction. On the other hand, the insides of the respective signal receiving coil 12 and signal transmitting coil 22 in the Z-axis direction are not covered by the first and second electromagnetic shielding members 17 and 27, respectively, but are opened, allowing the signal transmitting coil 22 and the signal receiving coil 12 to be magnetically coupled to each other as in the fifth embodiment.

As described above, in the present embodiment, the first and second electromagnetic shielding members 17 and 27 each cover the periphery of its corresponding coil for signal transmission in a wider range, thereby making it possible to reliably prevent magnetic coupling between the coil for signal transmission and the coil for power transmission in each coil unit.

Figure 9:
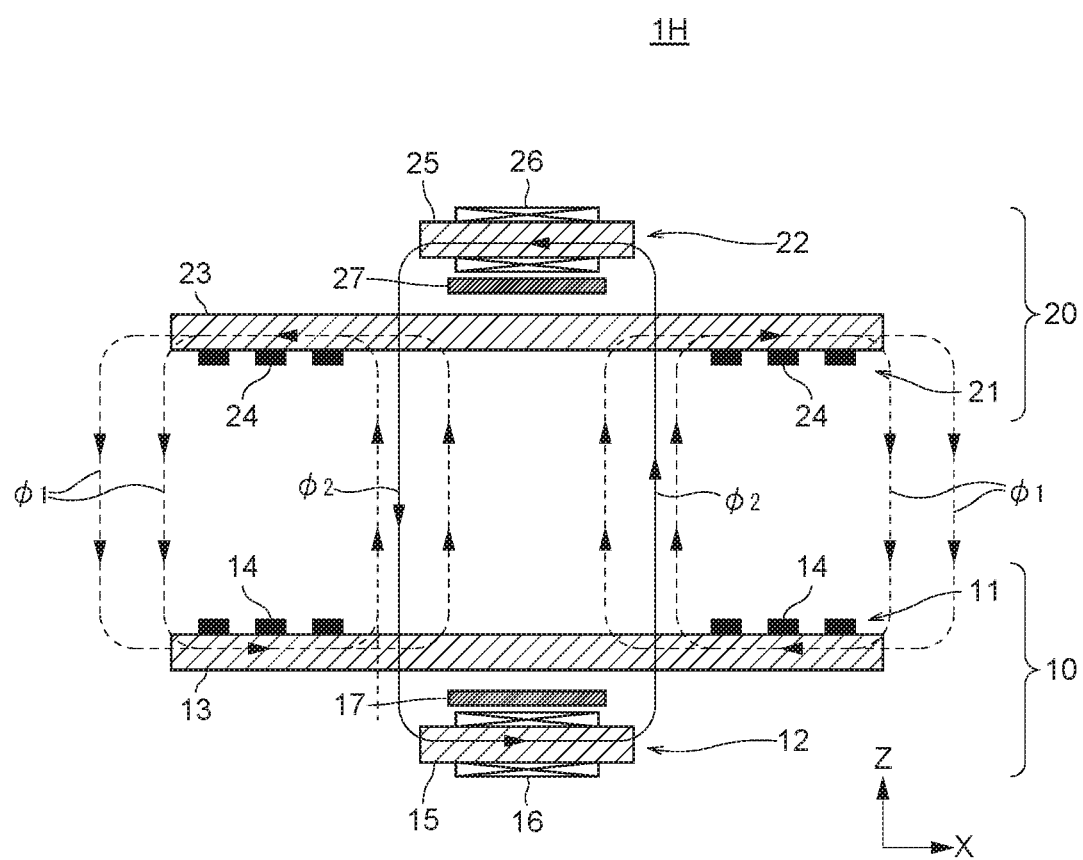
FIG. 9 is a schematic cross-sectional view illustrating the structure of a magnetic coupling device according to an eighth embodiment of the present invention.

FIG. 9 is a schematic cross-sectional view illustrating the structure of a magnetic coupling device according to the eighth embodiment of the present invention.

As illustrated in FIG. 9, a magnetic coupling device 1H of the present embodiment is a modification of the magnetic coupling device 1E according to the fifth embodiment (FIG. 6) and is featured in that the first electromagnetic shielding member 17 is disposed between the power transmitting coil 11 and the signal receiving coil 12 and that the second electromagnetic shielding member 27 is disposed between the power receiving coil 21 and the signal transmitting coil 22. The planar size of the first electromagnetic shielding member 17 is smaller than the planar size of the magnetic core 15, and the planar size of the second electromagnetic shielding member 27 is smaller than the planar size of the magnetic core 25. The planar size of the first electromagnetic shielding member 17 is preferably larger than a forming area of the conducting wire 16 of the signal receiving coil 12, and the planar size of the second electromagnetic shielding member 27 is preferably larger than a forming area of the conducting wire 26 of the signal transmitting coil 22.

In the present embodiment as well, the magnetic flux $\phi_2$ generated from the signal transmitting coil 22 passes inside the loops of the power receiving coil 21 and power transmitting coil 11 and penetrates the magnetic cores 13 and 23 to interlink the signal receiving coil 12, whereby the signal transmitting coil 22 and the signal receiving coil 12 are magnetically coupled to each other, thus enabling signal transmission. Further, the planar sizes of the first and second electromagnetic shielding members 17 and 27 are each smaller than the planar size of the magnetic core of the coil for signal transmission, so that it is possible to prevent magnetic coupling between the coil for power transmission and the coil for signal transmission while reliably magnetically coupling the signal transmitting coil 22 and the signal receiving coil 12 to each other by the loop of the magnetic flux $\phi_2$.

Figure 10A:
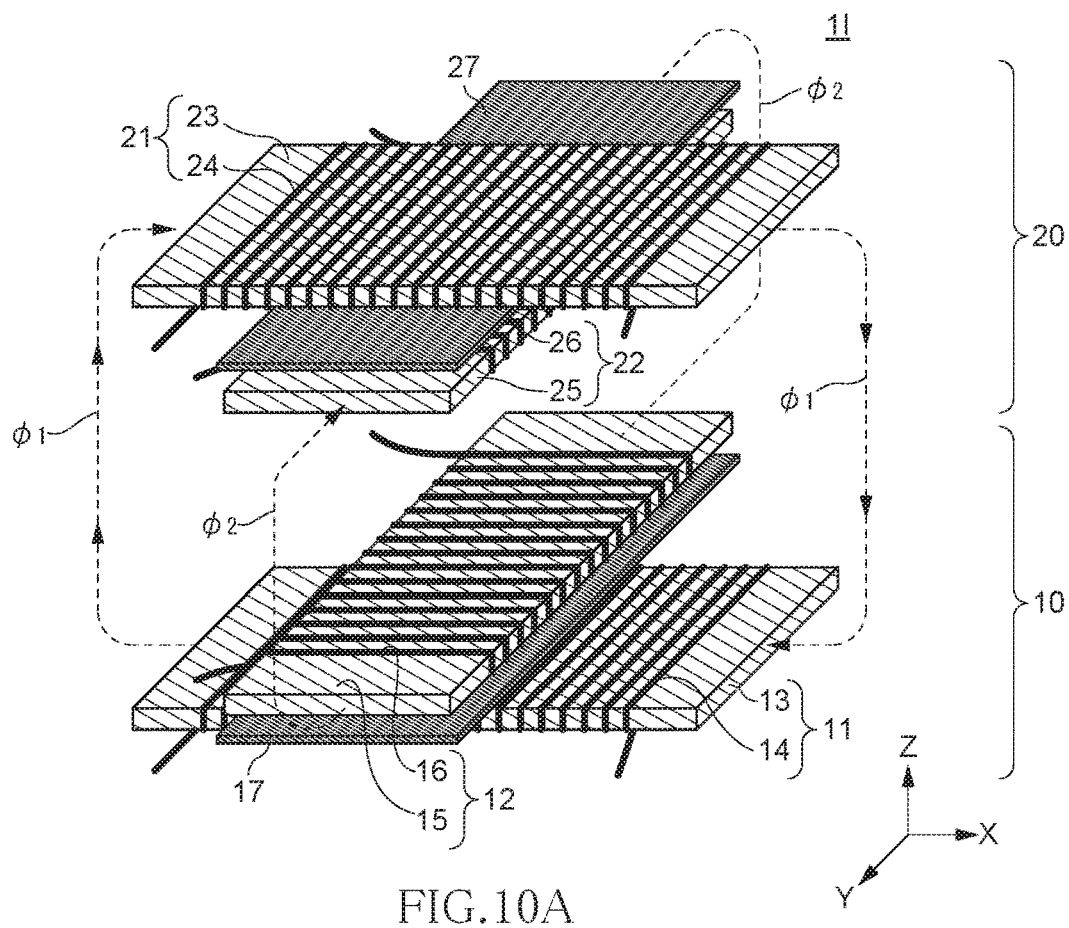
FIG. 10A is a schematic cross-sectional view illustrating the structure of a magnetic coupling device according to a ninth embodiment of the present invention.
Figure 10B:
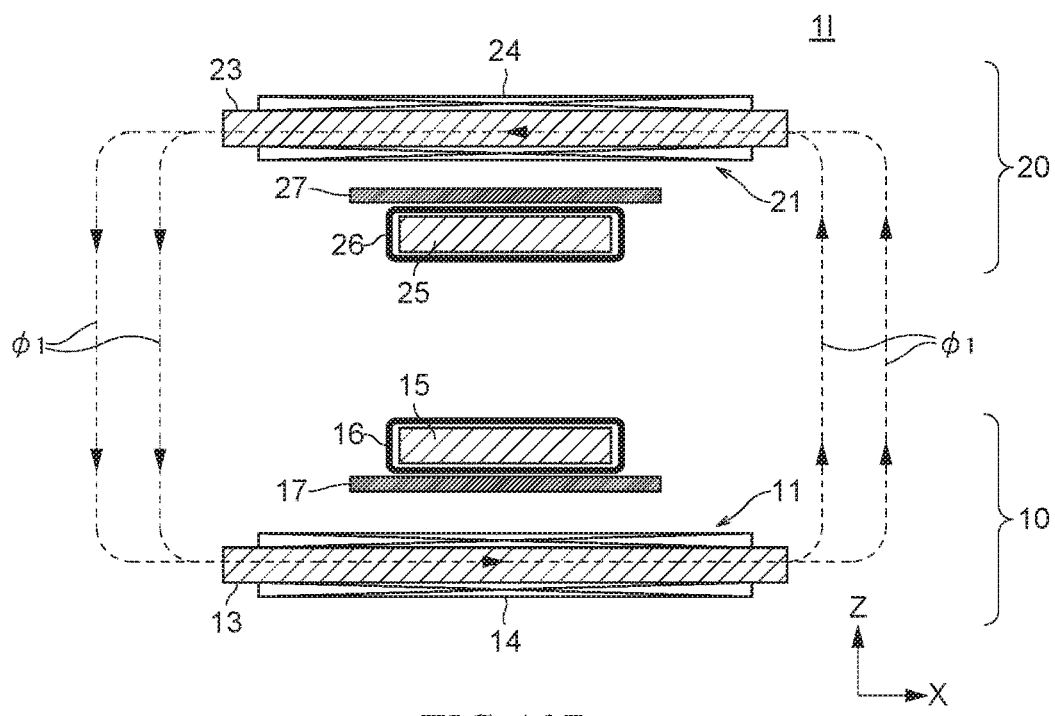
FIG. 10B is a schematic cross-sectional side view illustrating the structure of the magnetic coupling device according to the ninth embodiment of the present invention.

FIGS. 10A and 10B are views illustrating the structure of a magnetic coupling device according to the ninth embodiment of the present invention. FIG. 10A is a schematic perspective view, and FIG. 10B is a schematic cross-sectional side view.

As illustrated in FIGS. 10A and 10B, a magnetic coupling device 1I of the present embodiment is featured in that not only the signal transmitting coil 22 and signal receiving coil 12 for signal transmission, but also the power transmitting coil 11 and power receiving coil 21 for power transmission are helically-wound solenoid coils. The coil axes of the respective power transmitting coil 11 and power receiving coil 21 (first solenoid coil) extend in the X-axis direction (first direction), while the coil axes of the respective signal transmitting coil 22 and signal receiving coil 12 (second solenoid coil) extend in the Y-axis direction (second direction). That is, the coil axis of the coil for signal transmission and the coil axis of the coil for power transmission are substantially orthogonal to each other.

As illustrated, in the power transmitting side coil unit 10, the X-axis direction size of the magnetic core 13 around which the power transmitting coil 11 is wound is larger than the X-axis direction size of the magnetic core 15 around which the signal receiving coil 12 is wound. Conversely, the Y-axis direction size of the magnetic core 13 is smaller than the Y-axis direction size of the magnetic core 15. Thus, a combination of the magnetic cores 13 and 15 forms a cross shape in a plan view. The same can be said for a combination of the magnetic cores 23 and 25 of the power receiving side coil unit 20. Thus, the loops of the magnetic flux $\phi_1$ and magnetic flux $\phi_2$ can be made orthogonal to each other.

The first electromagnetic shielding member 17 is disposed between the power transmitting coil 11 and the signal receiving coil 12, and the second electromagnetic shielding member 27 is disposed between the power receiving coil 21 and the signal transmitting coil 22. The first electromagnetic shielding member 17 is preferably configured to cover at least a forming area of the conducting wire 16 of the signal receiving coil 12 as viewed in the Z-axis direction (third direction) and more preferably to cover the entire magnetic core 15 around which the signal receiving coil 12 is wound. The second electromagnetic shielding member 27 is preferably configured to cover at least a forming area of the conducting wire 26 of the signal transmitting coil 22 as viewed in the Z-axis direction and more preferably to cover the entire magnetic core 25 around which the signal transmitting coil 22 is wound.

As described above, the magnetic coupling device 1I according to the present embodiment has the power transmitting side coil unit 10 including a combination of the power transmitting coil 11 and the signal receiving coil 12 and the power receiving side coil unit 20 including a combination of the power receiving coil 21 and the signal transmitting coil 22. The power transmitting side coil unit 10 has the first electromagnetic shielding member 17 disposed at a position preventing magnetic coupling between the power transmitting coil 11 and the signal receiving coil 12, and the power receiving side coil unit 20 has the second electromagnetic shielding member 27 disposed at a position preventing magnetic coupling between the power receiving coil 21 and the signal transmitting coil 22. Thus, as in the first embodiment, it is possible to establish signal transmission with minimum influence of the magnetic flux for power transmission, thereby enhancing performance of the wireless power transmission system 100.

Figure 11A:
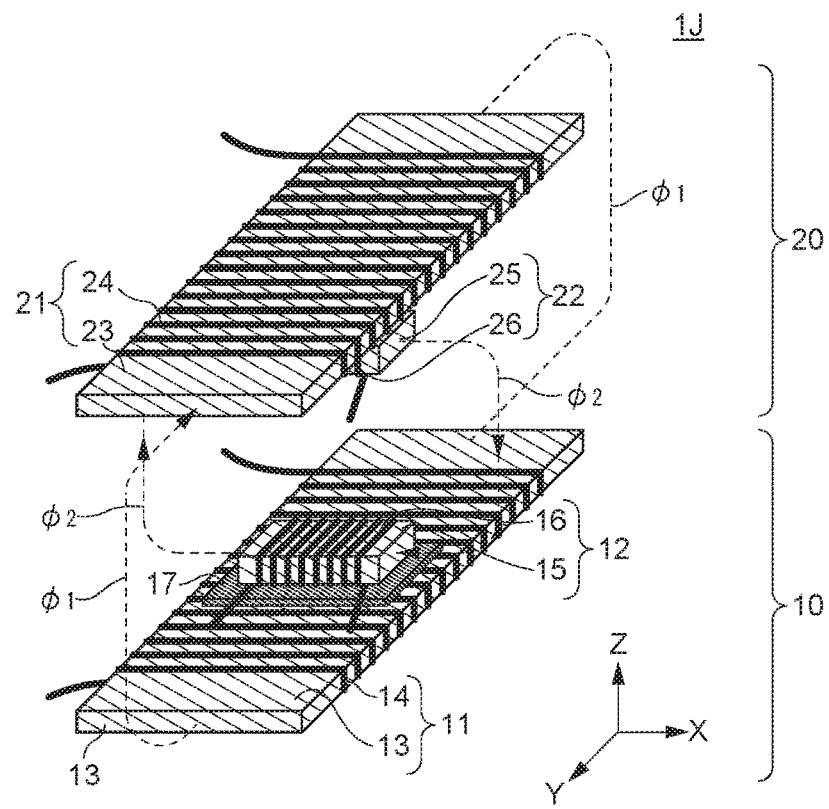
FIG. 11A is a schematic cross-sectional view illustrating the structure of a magnetic coupling device according to a tenth embodiment of the present invention.
Figure 11B:
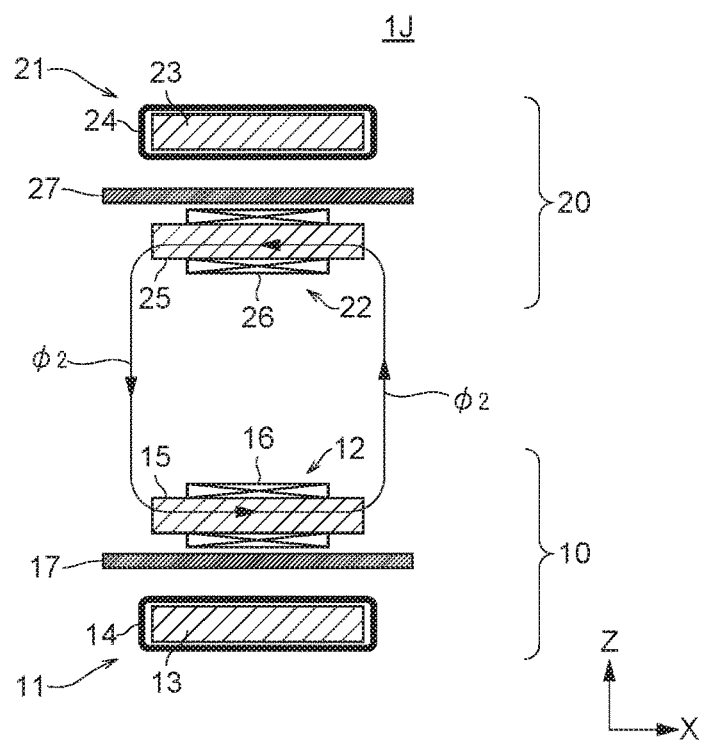
FIG. 11B is a schematic cross-sectional side view illustrating the structure of the magnetic coupling device according to the tenth embodiment of the present invention.

FIGS. 11A and 11B are views illustrating the structure of a magnetic coupling device according to a tenth embodiment of the present invention. FIG. 11A is a schematic perspective view, and FIG. 11B is a schematic cross-sectional side view.

As illustrated in FIGS. 11A and 11B, a magnetic coupling device 1J of the present embodiment is a modification of the magnetic coupling device 1I according to the ninth embodiment (FIGS. 10A and 10B) and is featured in that the planar sizes of the signal receiving coil 12 and signal transmitting coil 22 are reduced. Correspondingly, the planar sizes of the magnetic cores 15 and 25 and first and second electromagnetic shielding members 17 and 27 are reduced. The first and second electromagnetic shielding members 17 and 27 are configured to cover at least conducting wire areas of the coils for signal transmission and preferably to entirely cover the magnetic cores around each of which the coil for signal transmission is wound.

The magnetic flux $\phi_1$ interlinking the power transmitting coil 11 and the power receiving coil 21 forms a large loop. On the other hand, the magnetic flux $\phi_2$ interlinking the signal transmitting coil 22 and the signal receiving coil 12 forms a small loop in a space sandwiched between the first and second electromagnetic shielding members 17 and 27 and is in an orthogonal relationship with the magnetic flux $\phi_1$. Thus, the magnetic flux $\phi_2$ is hardly influenced by the magnetic flux $\phi_1$. Further, a part of the magnetic flux $\phi_1$ generated from the power transmitting coil 11 and traveling toward the power receiving side coil unit 20 is shielded by the first and second electromagnetic shielding members 17 and 27 and cannot enter a space sandwiched between the first and second electromagnetic shielding members 17 and 27. Thus, it is possible to improve signal quality by suppressing influence that the magnetic flux $\phi_1$ for power transmission has on the magnetic flux $\phi_2$ for signal transmission.

Thus, as in the ninth embodiment, it is possible to establish signal transmission with minimum influence of the magnetic flux for power transmission, thereby enhancing performance of the wireless power transmission system 100.

Figure 12:
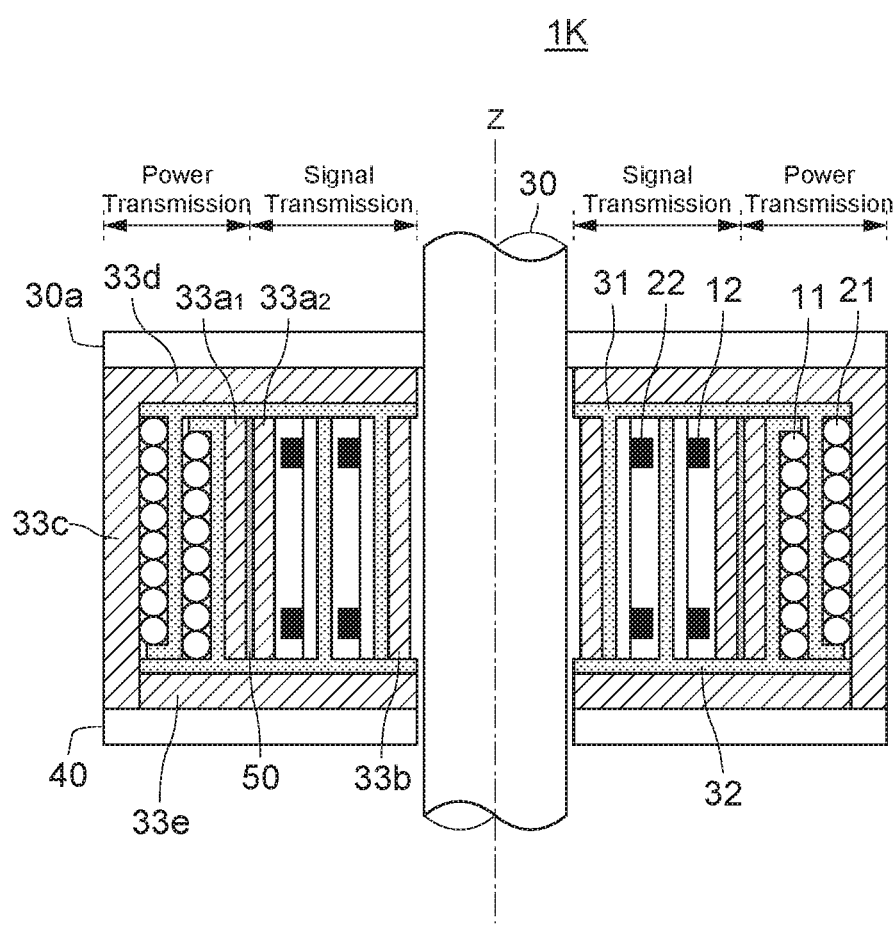
FIG. 12 is a schematic cross-sectional view illustrating the structure of a magnetic coupling device according to an eleventh embodiment of the present invention.
Figure 13:
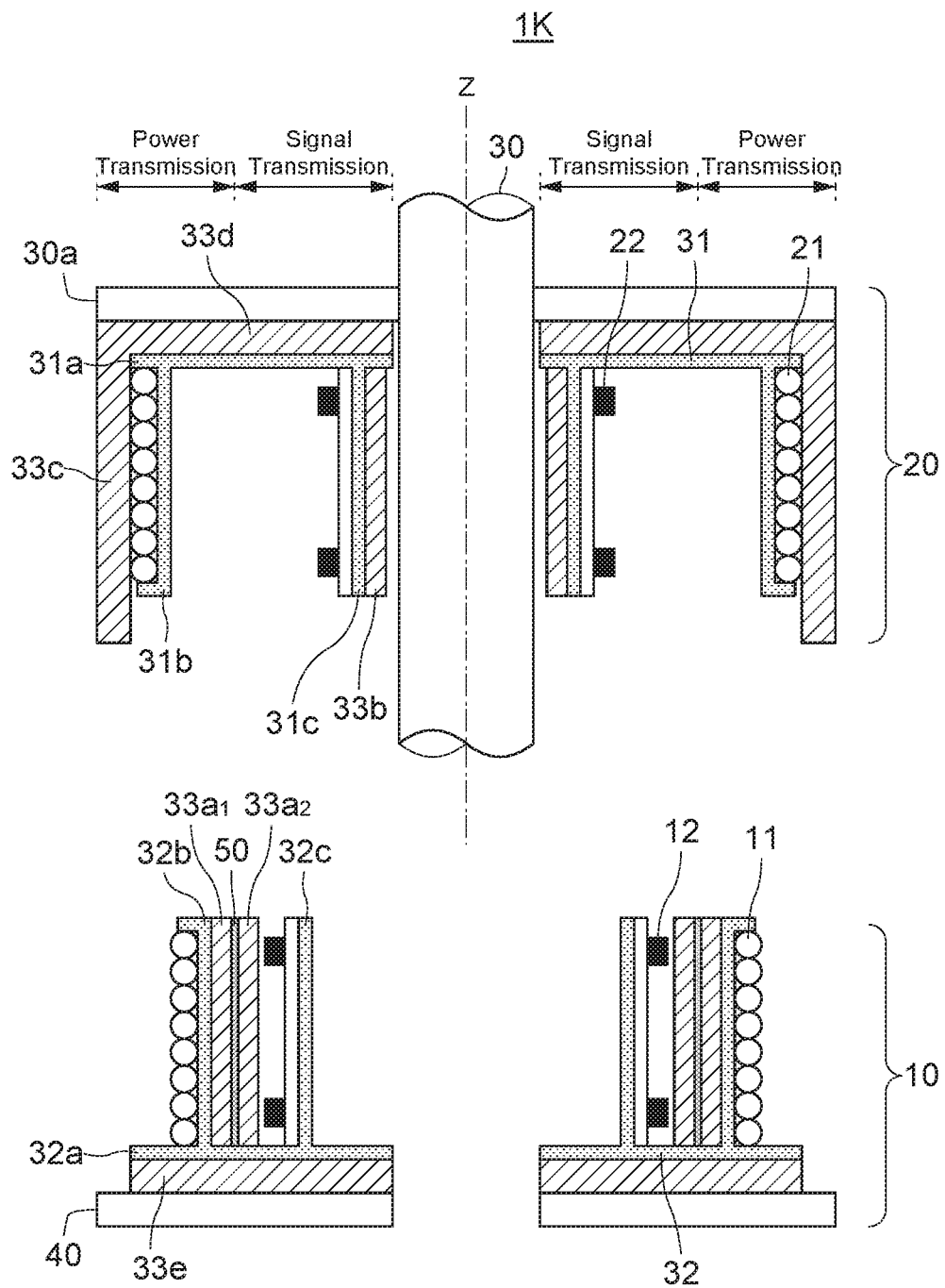
FIG. 13 is an exploded view of the magnetic coupling device illustrated in FIG. 12.

FIG. 12 is a schematic cross-sectional view illustrating the structure of a magnetic coupling device according to an eleventh embodiment of the present invention. FIG. 13 is an exploded view of the magnetic coupling device illustrated in FIG. 12.

As illustrated in FIGS. 12 and 13, in a magnetic coupling device 1K of the present embodiment, a combination of the power transmitting coil 11 and the power receiving coil 21 constitutes a power transmission rotary transformer incorporated in a rotating body, a combination of the signal transmitting coil 22 and the signal receiving coil 12 constitutes a signal transmission rotary transformer incorporated in the same rotating body as that incorporating the power transmission rotary transformer, and a combination of the two transformers constitutes a rotary type magnetic coupling device.

The magnetic coupling device 1K includes a rotating bobbin 31 (first support member) mounted to a flange part 30a of a rotary shaft 30 as a rotating body and rotated together with the rotary shaft 30, a fixed bobbin 32 (second support member) mounted to a non-rotating body 40, power transmitting coil 11 and signal receiving coil 12 which are provided in the fixed bobbin 32, and power receiving coil 21 and signal transmitting coil 22 which are provided in the rotating bobbin 31. In the present embodiment, the rotary shaft 30 is made of metal and penetrates the center portion of the rotating bobbin 31 and fixed bobbin 32. A reverse configuration may be employed, in which the power transmitting coil 11 and signal receiving coil 12 are rotated together with the rotating body, and the power receiving coil 21 and signal transmitting coil 22 are fixed.

The rotating bobbin 31 and the fixed bobbin 32 are made of resin and have cup shapes that are fitted to each other. More specifically, the rotating bobbin 31 has a cup shape opened downward, and the fixed bobbin 32 has a cup shape opened upward. The rotating bobbin 31 is rotatably fitted to the fixed bobbin 32 to be apparently integrated therewith. The fixed bobbin 32 is fixed and thus not rotated together with the rotating bobbin 31 and rotary shaft 30. The positional relationship between the fixed bobbin 32 and the rotating bobbin 31 is illustrative, and the vertical positions of the fixed bobbin 32 and rotating bobbin 31 may be reversed.

The rotating bobbin 31 and the fixed bobbin 32 each have a double cylindrical side wall structure. Specifically, the rotating bobbin 31 has a circular upper surface part 31a (main surface part), a cylindrical outer side surface part 31b provided radially inside the outermost periphery of the upper surface part 31a, and an inner side surface part 31c provided radially inside the outer side surface part 31b. The fixed bobbin 32 has a circular bottom surface part 32a (main surface part), an outer side surface part 32b provided radially slightly inside the outermost periphery of the bottom surface part 32a, and an inner side surface part 32c provided radially inside the outer side surface part 32b. As illustrated in FIG. 12, when the rotating bobbin 31 is fitted to the fixed bobbin 32, the outer side surface part 32b and inner side surface part 32c of the fixed bobbin 32 are disposed in a space between the outer side surface part 31b and the inner side surface part 31c of the rotating bobbin 31.

The power transmitting coil 11 is a solenoid coil composed of a conducting wire wound around the outer peripheral surface of the outer side surface part 32b of the fixed bobbin 32 with a number of turns, and the power receiving coil 21 is a solenoid coil composed of a conducting wire wound around the outer side surface part 31b of the rotating bobbin 31 with a number of turns. By using a conducting wire having a certain degree of thickness for the power transmitting coil 11 and signal receiving coil 12, a large current can be made to flow, thereby enabling wireless transmission of high power.

The power transmitting coil 11 and power receiving coil 21 are disposed coaxially with the rotary shaft 30 so as to surround the periphery of the rotary shaft 30. Although the power receiving coil 21 is disposed radially outside the power transmitting coil 11 in a concentric manner therewith in the present embodiment, the power receiving coil 21 may be disposed radially inside the power transmitting coil 11 in a concentric manner therewith. The opening portion of the power transmitting coil 11 is directed to the extending direction (rotary shaft Z-direction) of the rotary shaft 30, and the opening portion of the power receiving coil 21 is also directed to the extending direction (rotary shaft Z-direction) of the rotary shaft 30, so that the coil axis of the power receiving coil 21 and the coil axis of the power transmitting coil 11 are directed to the same direction. Thus, the opening portion of the power receiving coil 21 overlaps the opening portion of the power transmitting coil 11, whereby strong magnetic coupling is generated between the power receiving coil 21 and the power transmitting coil 11.

The signal transmitting coil 22 is provided on the outer peripheral surface of the inner side surface part 31c of the rotating bobbin 31. The signal receiving coil 12 is provided on the outer peripheral surface of the inner side surface part 32c of the fixed bobbin 32. The signal transmitting coil 22 and signal receiving coil 12 are disposed coaxially with the rotary shaft 30 such that the opening portions thereof surround the periphery of the rotary shaft 30. Although the signal receiving coil 12 is disposed radially outside the signal transmitting coil 22 in a concentric manner therewith in the present embodiment, the signal receiving coil 12 may be disposed radially inside the signal transmitting coil 22 in a concentric manner therewith. With the above configuration, the coil axes of the respective signal transmitting coil 22 and signal receiving coil 12 extend in the radial direction of the rotating body, and the opening portion of the signal receiving coil 12 radially overlaps the opening portion of the signal transmitting coil 22.

Figure 14A:
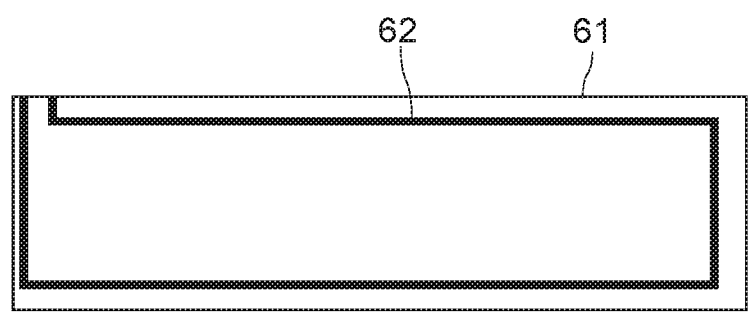
FIG. 14A is a developed plan view illustrating the configurations of the respective transmitting coil and receiving coil.
Figure 14B:
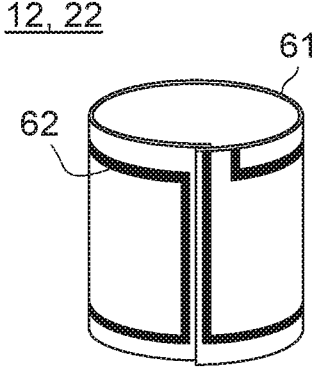
FIG. 14B is a perspective view illustrating the configurations of the respective transmitting coil and receiving coil.

FIGS. 14A and 14B are views illustrating the configurations of the respective signal transmitting coil 22 and signal receiving coil 12. FIG. 14A is a developed plan view and FIG. 14B is a perspective view.

As illustrated in FIG. 14A, the signal transmitting coil 22 (or signal receiving coil 12) is obtained by printing a conductor pattern 62 on the surface layer or inner layer of an elongated substantially rectangular flexible substrate 61 (insulating film). The signal transmitting coil 22 (signal receiving coil 12) is a loop coil of about one turn and formed so as to draw the largest possible loop along the outer periphery of the flexile flexible substrate 61. The signal transmitting coil 22 (signal receiving coil 12) extends from one end side of the flexible substrate 61 in the longitudinal direction thereof to circulate around the rotating axis Z in the clockwise direction, then turns back at the other end side of the flexible substrate 61 in the longitudinal direction to circulate around the rotating axis Z in the counterclockwise direction, and returns to the one end side of the flexible substrate 61 in the longitudinal direction. The number of turns of the loop coil is not particularly limited and may be two or more.

As illustrated in FIG. 14B, the flexible substrate 61 is rolled so as to surround the periphery of the rotating axis Z to form a cylindrical body. One end of the flexible substrate 61 in the longitudinal direction is connected to the other end thereof, whereby end portions of the loop coil in the longitudinal direction of the flexible substrate 61 are disposed in proximity to each other. The signal transmitting coil 22 (signal receiving coil 12) is formed on the cylindrical surface, so that a part of the conducting wire that is parallel to the longitudinal direction of the flexible substrate 61 extends in the circumferential direction, and a part of the conducting wire that is parallel to the short length direction of the flexible substrate 61 extends in parallel to the rotating axis Z. Further, the coil axis of the loop coil radially extends in a direction orthogonal to the rotating axis Z.

A magnetic body (ferrite core) is provided inside and outside the rotating bobbin 31 and fixed bobbin 32. Specifically, the magnetic body includes a double-layered intermediate magnetic body 33a provided so as to overlap the signal receiving coil 12 on the inner side surface part 32c of the fixed bobbin 32, an inner magnetic body 33b provided radially inside (inside the inner side surface part 31c of the rotating bobbin 31) the signal transmitting coil 22 and signal receiving coil 12 at a portion between the transmitting and receiving coils 22 and 12 and the rotary shaft 30, an outer magnetic body 33c provided so as to overlap the power receiving coil 21 on the outer side surface part 31b of the rotating bobbin 31, an upper magnetic body 33d provided so as to cover the upper surface part 31a of the rotating bobbin 31, and a bottom magnetic body 33e provided so as to cover the bottom surface part 32a of the fixed bobbin 32.

The intermediate magnetic body 33a has a double-layered structure and includes a first cylindrical magnetic layer $33a_1$ and a second cylindrical magnetic layer $33a_2$ positioned inside the first cylindrical magnetic layer $33a_1$. An electromagnetic shielding member 50 is provided between the first cylindrical magnetic layer $33a_1$ and the second cylindrical magnetic layer $33a_2$. That is, the first cylindrical magnetic layer $33a_1$ is disposed between the coils for power transmission provided in the power transmitting and receiving side coil units 10 and 20 and the electromagnetic shielding member 50, and the second cylindrical magnetic layer $33a_2$ is disposed between the coils for signal transmission provided in the power transmitting and receiving side coil units 10 and 20 and the electromagnetic shielding member 50. The first cylindrical magnetic layer $33a_1$ constitutes a magnetic path of the magnetic flux $\phi_1$ interlinking the power transmission rotary transformer constituted by a combination of the power transmitting coil 11 and the power receiving coil 21, and the second cylindrical magnetic layer $33a_2$ constitutes a magnetic path of the magnetic flux $\phi_2$ interlinking the signal transmission rotary transformer constituted by a combination of the signal transmitting coil 22 and the signal receiving coil 12.

The inner magnetic body 33b is disposed radially inside the innermost signal transmitting coil 22 and, particularly, the inner magnetic body 33b is disposed between the rotary shaft 30 and the signal transmitting coil 22 so as to surround the periphery of the rotary shaft 30. With this configuration, even when the metal rotary shaft 30 is disposed near the signal transmission rotary transformer constituted by a combination of the signal transmitting coil 22 and the signal receiving coil 12, an eddy current loss due to interlinkage between the magnetic fluxes generated from the signal transmitting coil 22 and signal receiving coil 12 and the rotary shaft 30 can be reduced.

The outer magnetic body 33c is disposed radially outside the outermost power receiving coil 21. With this configuration, even when a metal member is disposed near the power transmission rotary transformer constituted by a combination of the power transmitting coil 11 and the power receiving coil 21, an eddy current loss due to interlinkage between the magnetic fluxes generated from the power transmitting coil 11 and power receiving coil 21 and the metal member can be reduced.

The upper magnetic body 33d and the bottom magnetic body 33e constitute, together with the outer magnetic body 33c, a magnetic cover that covers the entire cylindrical case constituted by the rotating bobbin 31 and fixed bobbin 32. With this configuration, a magnetic path can be formed on both sides of the four coils in the rotating axis direction, thereby providing both a closed magnetic path of the magnetic fluxes generated from the power transmitting coil 11 and power receiving coil 21 and a closed magnetic path of the magnetic fluxes generated from the signal transmitting coil 22 and signal receiving coil 12. Thus, a power loss and a signal loss can further be reduced.

As described above, the electromagnetic shielding member 50 is provided between the power transmitting coil 11 and the signal receiving coil 12 in the radial direction. The electromagnetic shielding member 50 has a cylindrical shape and is sandwiched between the first and second cylindrical magnetic layers $33a_1$ and $33a_2$ constituting the intermediate magnetic body $33a$. The electromagnetic shielding member 50 is disposed between the power transmission rotary transformer constituted by a combination of the power transmitting coil 11 and the power receiving coil 21 and the signal transmission rotary transformer constituted by a combination of the signal transmitting coil 22 and the signal receiving coil 12 to magnetically isolate them from each other. With this configuration, the power transmitting and power receiving coils 11 and 21 and the signal transmitting and receiving coils 22 and 12 are magnetically isolated, so that mutual influence between power transmission and signal transmission can further be reduced.

In the above first embodiment, the first and second electromagnetic shielding members 17 and 27 are provided in the power transmitting side coil unit 10 and the power receiving side coil unit 20, respectively; however, in the magnetic coupling device 1K according to the present embodiment, it is sufficient to provide the electromagnetic shielding member 50 in only one of the power transmitting and receiving side coil units 10 and 20. This is because when the power transmitting and receiving side coil units 10 and 20 are combined, the electromagnetic shielding member 50 can prevent not only magnetic coupling between the power receiving coil 21 and the signal transmitting coil 22 in the power receiving side coil unit 20, but also magnetic coupling between the power transmitting coil 11 and the signal receiving coil 12 in the power transmitting side coil unit 10.

While the magnetic coupling device 1K according to the present embodiment is configured as a rotary type magnetic coupling device, it can provide the same effects as those of the first embodiment. That is, the magnetic coupling device 1K has the power transmitting side coil unit 10 including a combination of the power transmitting coil 11 and the signal receiving coil 12 and the power receiving side coil unit 20 including a combination of the power receiving coil 21 and the signal transmitting coil 22, and the power transmitting side coil unit 10 has the electromagnetic shielding member 50 that prevents not only magnetic coupling between the power transmitting coil 11 and the signal receiving coil 12, but also magnetic coupling between the power receiving coil 21 and the signal transmitting coil 22. Thus, it is possible to establish signal transmission with minimum influence of the magnetic flux for power transmission, thereby enhancing performance of the wireless power transmission system 100.

It is apparent that the present invention is not limited to the above embodiments, but may be modified and changed without departing from the scope and spirit of the invention.

Figure 15A:
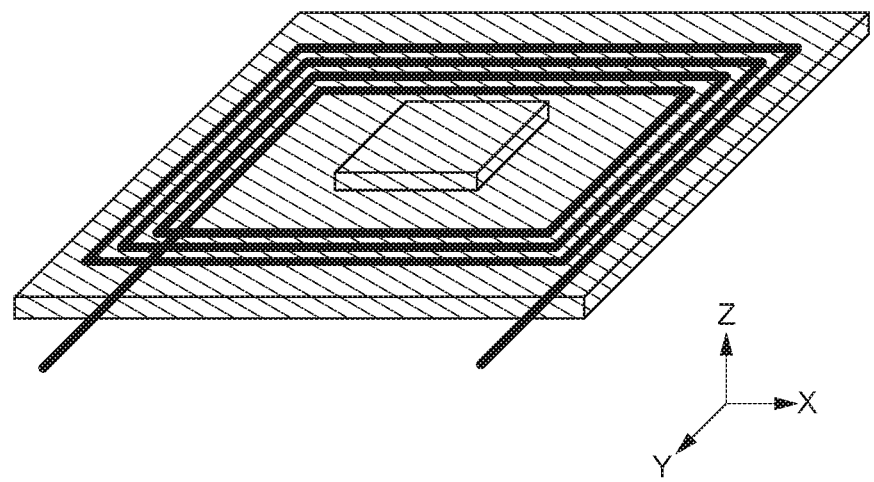
FIGS. 15A and 15B are perspective views illustrating modified structures of the magnetic core.
Figure 15B:
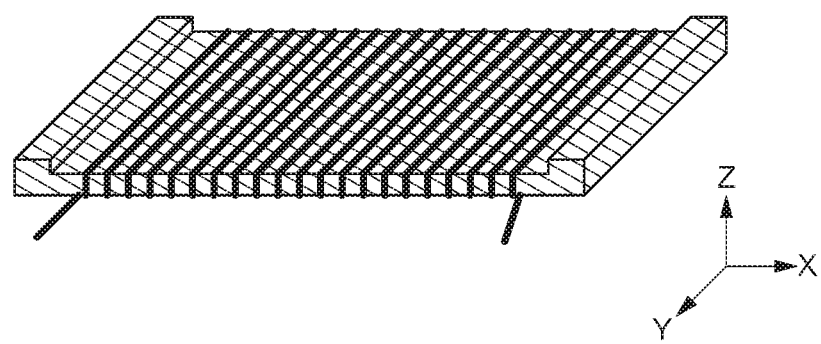

For example, the magnetic cores 13 and 23 for forming the spiral coil need not have a completely flat substrate shape but may have, e.g., a shape in which the center portion inside the spiral pattern protrudes, as illustrated in FIG. 15A. Alternatively, the magnetic core for forming the solenoid coil need not have a completely flat substrate shape but may have, e.g., a shape in which a flange part is provided on both ends thereof in the coil axis direction, as illustrated in FIG. 15B.

Figure 16A:
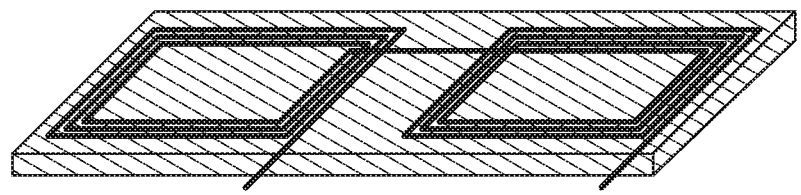
FIGS. 16A to 16C are perspective views illustrating modified structures of the coil.
Figure 16B:
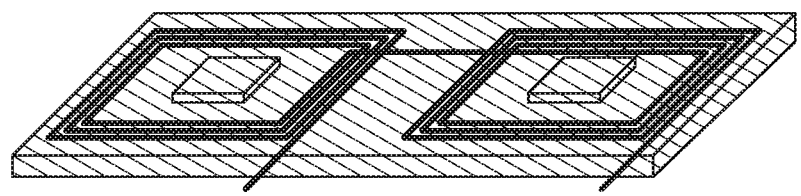
Figure 16C:
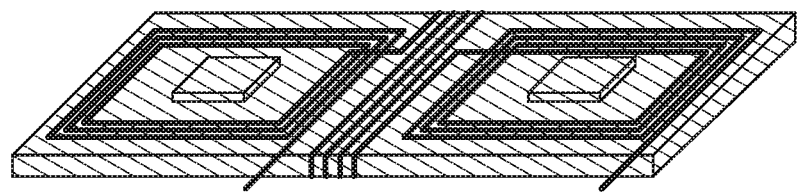

Further, in the above embodiments, a simple solenoid coil and a simple spiral coil are combined; however, the present invention is not limited to this. For example, the solenoid coil may have a structure in which a series connection circuit of two spiral coils is formed on a single magnetic body as illustrated in FIG. 16A. Alternatively, as illustrated in FIG. 16B, a structure in which a protruding part of the magnetic core is formed inside each of two spiral coils may be possible. Further alternatively, as illustrated in FIG. 16C, a structure in which the solenoid coil is provided between two spiral coils may be employed.

Further, in the above embodiments, the electromagnetic shielding member is provided both in the power transmitting and receiving side coil units 10 and 20; however, the electromagnetic shielding member may be provided in only one of the power transmitting and receiving side coil units 10 and 20.

Further, in the above embodiments, each coil unit includes a combination of a coil for power transmission and a coil for signal transmission; however, both the two coils to be combined may be adapted for power transmission, or may be adapted for signal transmission.

As described above, according to the present embodiments, there is provided a magnetic coupling device that includes first and second coil units that transmit power or signals with each other by wireless, wherein each of the first and second coil units includes a first coil and a second coil, wherein the first coil of the first coil unit and the first coil of the second coil unit are magnetically coupled to each other, wherein the second coil of the first coil unit and the second coil of the second coil unit are magnetically coupled to each other, and wherein at least one of the first and second coil units has an electromagnetic shielding member disposed at a position preventing magnetic coupling between the first and second coils.

According to the present embodiments, influence that a magnetic flux generated from one of the first and second coils has on the other one thereof can be suppressed by the electromagnetic shielding member. It is difficult to completely prevent magnetic coupling between the first and second coils by the electromagnetic shielding member; however, when the electromagnetic shielding member is disposed at a position disposed at a position preventing magnetic coupling between the first and second coils, i.e., a position that shields at least a magnetic flux contributing to magnetic coupling, a reduction in the degree of magnetic coupling between the first and second coils can be expected. Thus, for example, when power is transmitted between the first coils of the respective first and second coil units, and signals are transmitted between the second coils of the respective first and second coil units, it is possible to establish signal transmission with minimum influence of the magnetic flux for power transmission.

In the present embodiments, the electromagnetic shielding member is preferably configured to cover at least a conducting wire forming area of the second coil as viewed in a direction in which the first and second coil units face each other. With this configuration, it is possible to further suppress influence that a magnetic flux generated from one of the first and second coils has on the other one thereof.

In the present embodiments, the electromagnetic shielding member is preferably configured to cover the periphery of the second coil as viewed in a direction in which the first and second coil units face each other. With this configuration, it is possible to further suppress influence that a magnetic flux generated from the first coil has on the second coil.

In the present embodiments, the electromagnetic shielding member is preferably disposed closer to the second coil than to the first coil. With this configuration, it is possible to suppress a reduction in transmission efficiency between the first coils while suppressing influence that a magnetic flux generated from the first coil has on the second coil.

In the present embodiments, it is preferable that the first coil comprises a spiral coil having a coil axis extending in a first direction, and that the second coil comprises a solenoid coil having a coil axis extending in a second direction substantially orthogonal to the first direction. With this configuration, it is possible to make the direction of a magnetic flux interlinking the first coil and the direction of a magnetic flux interlinking the second coil orthogonal to each other to thereby minimize mutual influence between the magnetic fluxes.

In the present embodiments, the planar size of the solenoid coil as viewed in the first direction is preferably smaller than the planar size of the opening portion of the spiral coil. With this configuration, it is possible to suppress influence that a magnetic flux generated from the spiral coil has on the solenoid coil.

In the present embodiments, at least one of the first and second coil units preferably further includes a first magnetic body constituting a magnetic path of a magnetic flux interlinking the spiral coil and a second magnetic body constituting a magnetic path of a magnetic flux interlinking the solenoid coil. Further, it is preferable that the spiral coil is preferably formed on the main surface of the first magnetic body, the solenoid coil is wound around the second magnetic body, the planar size of the second magnetic body as viewed in the first direction is smaller than the planar size of the opening portion of the spiral coil, and the electromagnetic shielding member is configured to cover the second magnetic body as viewed in the first direction. With the above configuration, it is possible to sufficiently suppress influence that a magnetic flux generated from the spiral coil has on the solenoid coil, thereby enhancing transmission efficiency between a pair of the solenoid coils.

In the present embodiments, it is preferable that the first magnetic body has a through hole that overlaps the opening portion of the spiral coil in a plan view, and that the planar size of the second magnetic body is smaller than the planar size of the through hole. With the above configuration, it is possible not only to reduce manufacturing cost of the first magnetic body but also to reduce the thickness of the coil unit by inserting the second coil into the through hole.

In the present embodiments, the first and second magnetic bodies are preferably not disposed on the same plane. With this configuration, it is possible to suppress influence that a magnetic flux generated from the spiral coil has on the solenoid coil to thereby enhance transmission efficiency between a pair of the solenoid coils.

In the present embodiments, it is preferable that the size of the solenoid coil in the second direction as viewed in the first direction is larger than the size of the opening portion of the spiral coil in the second direction, and that the size of the solenoid coil in a third direction substantially orthogonal to both the first and second directions as viewed in the first direction is smaller than the size of the opening portion of the spiral coil in the third direction. Even with this configuration, it is possible to suppress influence that a magnetic flux generated from the spiral coil has on the solenoid coil. Further, it is possible to increase the number of turns of the solenoid coil to enhance the degree of magnetic coupling between the solenoid coils, which in turn enhances transmission efficiency.

In the present embodiments, at least one of the first and second coil units preferably further includes a first magnetic body constituting a magnetic path of a magnetic flux interlinking the spiral coil and a second magnetic body constituting a magnetic path of a magnetic flux interlinking the solenoid coil. Further, it is preferable that the spiral coil is formed on the main surface of the first magnetic body, the solenoid coil is wound around the second magnetic body, the size of the second magnetic body in the second direction as viewed in the first direction is larger than the size of the first magnetic body in the second direction, and the size of the second magnetic body in the third direction as viewed in the first direction is smaller than the size of the opening portion of the spiral coil in the third direction. With the above configuration, it is possible to further suppress influence that a magnetic flux generated from the spiral coil has on the solenoid coil.

In the present embodiments, it is preferable that the second coil comprises a spiral coil having a coil axis extending in a first direction, the first coil comprises a solenoid coil having a coil axis extending in a second direction substantially orthogonal to the first direction, and the planar size of the spiral coil as viewed in the first direction is smaller than the planar size of the solenoid coil. With the above configuration, it is possible to make the direction of a magnetic flux interlinking the first coil and the direction of a magnetic flux interlinking the second coil orthogonal to each other to thereby minimize mutual influence between the magnetic fluxes.

In the present embodiments, the solenoid coil of the first coil unit and the solenoid coil of the second coil unit are preferably provided in a space sandwiched between the spiral coil of the first coil unit and the spiral coil of the second coil unit. In this case, the electromagnetic shielding member is preferably disposed between at least one of the first and second coils of the first coil unit and the first and second coils of the second coil unit. With the above configuration, it is possible to easily suppress influence that a magnetic flux generated from the spiral coil has on the solenoid coil.

In the present embodiments, the solenoid coil of the first coil unit and the solenoid coil of the second coil unit are preferably provided outside a space sandwiched between the spiral coil of the first coil unit and the spiral coil of the second coil unit. Even with this configuration, it is possible to suppress influence that a magnetic flux generated from the spiral coil has on the solenoid coil.

In the present embodiments, it is preferable that the solenoid coil of the first coil unit and solenoid coil of the second coil unit are provided outside a space sandwiched between the spiral coil of the first coil unit and the spiral coil of the second coil unit, the electromagnetic shielding member is disposed between at least one of the spiral and solenoid coils of the first coil unit and the spiral and solenoid coils of the second coil unit, and the planar size of the electromagnetic shielding member is smaller than the planar size of the second magnetic body. With the above configuration, it is possible to suppress influence that a magnetic flux generated from the spiral coil has on the solenoid coil without deteriorating transmission efficiency between a pair of the solenoid coils by the electromagnetic shielding member.

In the present embodiments, it is preferable that the first coil comprises a first solenoid coil having a coil axis extending in a first direction, and that the second coil comprises a second solenoid coil having a coil axis extending in a second direction substantially orthogonal to the first direction. With this configuration, it is possible to make the direction of a magnetic flux interlinking the first coil and the direction of a magnetic flux interlinking the second coil substantially orthogonal to each other to thereby minimize mutual influence between the magnetic fluxes.

In the present embodiments, at least one of the first and second coil units preferably further includes a first magnetic body constituting a magnetic path of a magnetic flux interlinking the first solenoid coil and a second magnetic body constituting a magnetic path of a magnetic flux interlinking the second solenoid coil. Further, it is preferable that the first solenoid coil is wound around the first magnetic body, the second solenoid coil is wound around the second magnetic body, and the electromagnetic shielding member is configured to cover the second magnetic body as viewed in a third direction substantially orthogonal to both the first and second directions. With the above configuration, it is possible to sufficiently suppress influence that a magnetic flux generated from the first solenoid coil has on the second solenoid coil, thereby enhancing transmission efficiency between a pair of the second solenoid coils.

In the present embodiments, it is preferable that the size of the first solenoid coil in the first direction as viewed in the third direction is larger than the size of the second solenoid coil in the first direction, and that the size of the first solenoid coil in the second direction as viewed in the third direction is smaller than the size of the second solenoid coil in the second direction. With this configuration, it is possible to make the direction of a magnetic flux interlinking the first solenoid and the direction of a magnetic flux interlinking the second solenoid coil orthogonal to each other to thereby minimize mutual influence between the magnetic fluxes.

In the present embodiments, it is preferable that the size of the first magnetic body in the first direction as viewed in the third direction is larger than the size of the second magnetic body in the first direction, and that the size of the first magnetic body in the second direction as viewed in the third direction is smaller than the size of the second magnetic body in the second direction. With this configuration, it is possible to further suppress influence that a magnetic flux generated from the first solenoid coil has on the second solenoid coil.

In the present embodiments, the planar size of the second solenoid coil as viewed in the third direction is preferably smaller than the planar size of the first solenoid coil.

In the present embodiments, the planar size of the second magnetic body as viewed in the third direction is preferably smaller than the planar size of the first magnetic body. With this configuration, it is possible to sufficiently suppress influence that a magnetic flux generated by the first solenoid coil has on the second solenoid coil to thereby enhance transmission efficiency between a pair of the second solenoid coils.

In the present embodiments, the second solenoid coil of the first coil unit and the second solenoid coil of the second coil unit are preferably provided in a space sandwiched between the first solenoid coil of the first coil unit and the first solenoid coil of the second coil unit. With this configuration, it is possible to easily suppress influence that a magnetic flux generated from the first solenoid coil has on the second solenoid coil.

The magnetic coupling device according to the present embodiments preferably further includes a first support member rotated about its rotating axis and a second support member not rotated together with the first support member. Further, it is preferable that one of the first and second coil units is provided in the first support member, and that the other one thereof is provided in the second support member. According to the present embodiments, power or signals can be transmitted between the first support member which is a rotating body and the second support member which is a non-rotating body (or another rotating body), and it is possible to suppress influence that a magnetic flux generated from one of the first and second coils has on the other one thereof by the electromagnetic shielding member.

In the present embodiments, it is preferable that the first coil comprises a solenoid coil, the second coil comprises a loop coil formed on a cylindrical surface, the coil axis of the solenoid coil extends in the rotating axis direction, and the coil axis of the loop coil radially extends in a direction substantially orthogonal to the rotating axis. As described above, the coil axes of a pair of the first coils extend in the rotating axis direction, and the coil axes of a pair of the second coils radially extend in a direction substantially orthogonal to the rotating axis, thus making it possible to make the direction of a magnetic flux interlinking the second coil and the direction of a magnetic flux interlinking the first coil orthogonal to each other. Thus, in a rotary type magnetic coupling device used for a rotating body, mutual influence between power or signal transmission between the pair of first coils and power or signal transmission between the pair of second coils can be reduced.

In the present embodiments, the first coils of the respective first and second coil units are preferably disposed radially outside the second coils of the respective first and second coil units with the electromagnetic shielding member interposed between the first coils and second coils. With this configuration, as compared to a case where a pair of the first coils are disposed radially inside a pair of the second coils, the pair of first coils can have a larger opening, thereby enhancing coil inductance and obtaining stronger magnetic coupling. Such a configuration is suitable for a case where power is transmitted using the pair of first coils, and signals are transmitted using the pair of second coils.

In the present embodiments, the electromagnetic shielding member comprises preferably a substantially cylindrical member disposed between the first coils of the respective first and second coil units and the second coils of the respective first and second coil units. With this configuration, influence that a magnetic flux generated from one of the first and second coils has on the other one thereof can be suppressed by the electromagnetic shielding member.

The magnetic coupling device according to the present embodiments preferably further includes an intermediate magnetic body disposed between the first coils of the respective first and second coil units and the second coils of the respective first and second coil units. Further, it is preferable that the intermediate magnetic body includes a first cylindrical magnetic layer and a second cylindrical magnetic layer disposed radially inside the first cylindrical magnetic layer, and that the electromagnetic shielding member is disposed between the first and second cylindrical magnetic layers. With the above configuration, it is possible to provide a magnetic path of a magnetic flux interlinking the pair of first coils and a magnetic path of a magnetic flux interlinking the pair of second coils without influence from the electromagnetic shielding member.

In the present embodiments, it is preferable that the first coils of the respective first and second coil units are coils for power transmission, and that the second coils of the respective first and second coil units are coils for signal transmission. With this configuration, it is possible to further suppress influence that a magnetic flux for power transmission has on signal transmission.

In the present embodiments, it is preferable that the first coil of the first coil unit is a power transmitting coil for power transmission, the first coil of the second coil unit is a power receiving coil for power transmission, the second coil of the first coil unit is a signal receiving coil for signal transmission, and the second coil of the second coil unit is a signal transmitting coil for signal transmission. With this configuration, it is possible to further suppress influence that a magnetic flux for power transmission has on signal transmission.

In the present embodiments, the frequency of the signal transmission is preferably 10 times or more the frequency of the power transmission. When the frequency of the signal transmission is 10 times or more the frequency of the power transmission, it is possible to suppress influence that harmonic noise of an AC voltage for power transmission has on an AC signal to avoid interference between the signal transmission and the power transmission, thereby ensuring transmission quality of the AC signal.

In the present embodiments, the signal transmission is preferably performed during the power transmission. When the signal transmission is performed during the power transmission, harmonic noise of an AC voltage for power transmission may have influence on an AC signal. However, the influence can be suppressed by providing the electromagnetic shielding member.

A wireless power transmission system according to the present embodiments includes the above-described magnetic coupling device according to the present embodiments, a power transmitting circuit that converts an input DC voltage into an AC voltage and outputs the AC voltage to the power transmitting coil, a control circuit that controls the AC voltage output from the power transmitting circuit based on the AC signal received by the signal receiving coil, a power receiving circuit that converts the AC voltage generated in the power receiving coil into a DC voltage, and a signal generating circuit that generates an AC signal indicating the magnitude of the output voltage or output current from the power receiving circuit. According to the present embodiments, it is possible to establish signal transmission with minimum influence of a magnetic flux for power transmission when power transmission is performed between the power transmitting coil and the power receiving coil and signal transmission is performed between the signal transmitting coil and the signal receiving coil.

According to the present embodiments, it is possible to provide a magnetic coupling device capable of establishing signal transmission with minimum influence of a magnetic flux for power transmission and a wireless power transmission system using the magnetic coupling device.

What is claimed is:

1. A magnetic coupling device comprising first and second coil units that transmit power or signals with each other by wireless,
    wherein each of the first and second coil units includes a first coil and a second coil,
    wherein the first coil of the first coil unit and the first coil of the second coil unit are magnetically coupled to each other,
    wherein the second coil of the first coil unit and the second coil of the second coil unit are magnetically coupled to each other, and
    wherein at least one of the first and second coil units has an electromagnetic shielding member disposed at a position preventing magnetic coupling between the first and second coils.

2. The magnetic coupling device as claimed in claim 1, wherein the electromagnetic shielding member is configured to cover at least a conducting wire forming area of the second coil as viewed in a direction in which the first and second coil units face each other.

3. The magnetic coupling device as claimed in claim 1, wherein the electromagnetic shielding member is configured to cover a periphery of the second coil as viewed in a direction in which the first and second coil units face each other.

4. The magnetic coupling device as claimed in claim 1, wherein the electromagnetic shielding member is disposed closer to the second coil than to the first coil.

5. The magnetic coupling device as claimed in claim 1,
    wherein the first coil comprises a spiral coil having a coil axis extending in a first direction, and
    wherein the second coil comprises a solenoid coil having a coil axis extending in a second direction substantially orthogonal to the first direction.

6. The magnetic coupling device as claimed in claim 5, wherein a planar size of the solenoid coil as viewed in the first direction is smaller than a planar size of an opening portion of the spiral coil.

7. The magnetic coupling device as claimed in claim 6,
    wherein at least one of the first and second coil units further includes a first magnetic body constituting a magnetic path of a magnetic flux interlinking the spiral coil and a second magnetic body constituting a magnetic path of a magnetic flux interlinking the solenoid coil,
    wherein the spiral coil is formed on a main surface of the first magnetic body,
    wherein the solenoid coil is wound around the second magnetic body,
    wherein a planar size of the second magnetic body as viewed in the first direction is smaller than the planar size of the opening portion of the spiral coil, and
    wherein the electromagnetic shielding member is configured to cover the second magnetic body as viewed in the first direction.

8. The magnetic coupling device as claimed in claim 7,
    wherein the first magnetic body has a through hole that overlaps the opening portion of the spiral coil in a plan view, and
    wherein the planar size of the second magnetic body is smaller than a planar size of the through hole.

9. The magnetic coupling device as claimed in claim 8, wherein the first and second magnetic bodies are not disposed on a same plane.

10. The magnetic coupling device as claimed in claim 5, wherein
    a size of the solenoid coil in the second direction as viewed in the first direction is larger than a size of an opening portion of the spiral coil in the second direction, and
    wherein a size of the solenoid coil in a third direction substantially orthogonal to both the first and second directions as viewed in the first direction is smaller than a size of the opening portion of the spiral coil in the third direction.

11. The magnetic coupling device as claimed in claim 10,
    wherein at least one of the first and second coil units further includes a first magnetic body constituting a magnetic path of a magnetic flux interlinking the spiral coil and a second magnetic body constituting a magnetic path of a magnetic flux interlinking the solenoid coil,
    wherein the spiral coil is formed on a main surface of the first magnetic body, wherein the solenoid coil is wound around the second magnetic body, wherein a size of the second magnetic body in the second direction as viewed in the first direction is larger than a size of the first magnetic body in the second direction, and wherein a size of the second magnetic body in the third direction as viewed in the first direction is smaller than the size of the opening portion of the spiral coil in the third direction.

12. The magnetic coupling device as claimed in claim 1, wherein the second coil comprises a spiral coil having a coil axis extending in a first direction, wherein the first coil comprises a solenoid coil having a coil axis extending in a second direction substantially orthogonal to the first direction, and wherein a planar size of the spiral coil as viewed in the first direction is smaller than a planar size of the solenoid coil.

13. The magnetic coupling device as claimed in claim 5, wherein the solenoid coil of the first coil unit and the solenoid coil of the second coil unit are provided in a space sandwiched between the spiral coil of the first coil unit and the spiral coil of the second coil unit.

14. The magnetic coupling device as claimed in claim 13, wherein the electromagnetic shielding member is disposed between at least one of the first and second coils of the first coil unit and the first and second coils of the second coil unit.

15. The magnetic coupling device as claimed in claim 5, wherein the solenoid coil of the first coil unit and the solenoid coil of the second coil unit are provided outside a space sandwiched between the spiral coil of the first coil unit and the spiral coil of the second coil unit.

16. The magnetic coupling device as claimed in claim 7,
wherein the solenoid coil of the first coil unit and solenoid coil of the second coil unit are provided outside a space sandwiched between the spiral coil of the first coil unit and the spiral coil of the second coil unit, wherein the electromagnetic shielding member is disposed between at least one of the spiral and solenoid coils of the first coil unit and the spiral and solenoid coils of the second coil unit, and wherein a planar size of the electromagnetic shielding member is smaller than the planar size of the second magnetic body.

17. The magnetic coupling device as claimed in claim 1,
wherein the first coil comprises a first solenoid coil having a coil axis extending in a first direction, and wherein the second coil comprises a second solenoid coil having a coil axis extending in a second direction substantially orthogonal to the first direction.

18. The magnetic coupling device as claimed in claim 17,
wherein at least one of the first and second coil units further includes a first magnetic body constituting a magnetic path of a magnetic flux interlinking the first solenoid coil and a second magnetic body constituting a magnetic path of a magnetic flux interlinking the second solenoid coil, wherein the first solenoid coil is wound around the first magnetic body, wherein the second solenoid coil is wound around the second magnetic body, and wherein the electromagnetic shielding member is configured to cover the second magnetic body as viewed in a third direction substantially orthogonal to both the first and second directions.

19. The magnetic coupling device as claimed in claim 18,
wherein a size of the first solenoid coil in the first direction as viewed in the third direction is larger than a size of the second solenoid coil in the first direction, and wherein a size of the first solenoid coil in the second direction as viewed in the third direction is smaller than a size of the second solenoid coil in the second direction.

20. The magnetic coupling device as claimed in claim 19,
wherein a size of the first magnetic body in the first direction as viewed in the third direction is larger than a size of the second magnetic body in the first direction, and wherein a size of the first magnetic body in the second direction as viewed in the third direction is smaller than a size of the second magnetic body in the second direction.

21. The magnetic coupling device as claimed in claim 18, wherein a planar size of the second solenoid coil as viewed in the third direction is smaller than a planar size of the first solenoid coil.

22. The magnetic coupling device as claimed in claim 21, wherein a planar size of the second magnetic body as viewed in the third direction is smaller than a planar size of the first magnetic body.

23. The magnetic coupling device as claimed in claim 17, wherein the second solenoid coil of the first coil unit and the second solenoid coil of the second coil unit are provided in a space sandwiched between the first solenoid coil of the first coil unit and the first solenoid coil of the second coil unit.

24. The magnetic coupling device as claimed in claim 1, further comprising:
a first support member rotated about its rotating axis; and
a second support member not rotated together with the first support member, wherein one of the first and second coil units is provided in the first support member, and wherein other one of the first and second coil units is provided in the second support member.

25. The magnetic coupling device as claimed in claim 24,
wherein the first coil comprises a solenoid coil,
wherein the second coil comprises a loop coil formed on a cylindrical surface,
wherein the coil axis of the solenoid coil extends in the rotating axis direction, and
wherein the coil axis of the loop coil radially extends in a direction substantially orthogonal to the rotating axis.

26. The magnetic coupling device as claimed in claim 25, wherein the first coils of the respective first and second coil units are disposed radially outside the second coils of the respective first and second coil units with the electromagnetic shielding member interposed between the first coils and second coils.

27. The magnetic coupling device as claimed in claim 26, wherein the electromagnetic shielding member comprises a substantially cylindrical member disposed between the first coils of the respective first and second coil units and the second coils of the respective first and second coil units.

28. The magnetic coupling device as claimed in claim 27, further comprising an intermediate magnetic body disposed between the first coils of the respective first and second coil units and the second coils of the respective first and second coil units, wherein the intermediate magnetic body includes a first cylindrical magnetic layer and a second cylindrical magnetic layer disposed radially inside the first cylindrical magnetic layer, and wherein the electromagnetic shielding member is disposed between the first and second cylindrical magnetic layers.

29. The magnetic coupling device as claimed in claim 1,
wherein the first coils of the respective first and second coil units are coils for power transmission, and
wherein the second coils of the respective first and second coil units are coils for signal transmission.

30. The magnetic coupling device as claimed in claim 29,
wherein the first coil of the first coil unit is a power transmitting coil for power transmission,
wherein the first coil of the second coil unit is a power receiving coil for power transmission,
wherein the second coil of the first coil unit is a signal receiving coil for signal transmission, and
wherein the second coil of the second coil unit is a signal transmitting coil for signal transmission.

31. The magnetic coupling device as claimed in claim 29, wherein the frequency of the signal transmission is 10 times or more the frequency of the power transmission.

32. The magnetic coupling device as claimed in claim 29, wherein the signal transmission is performed during the power transmission.

33. A wireless power transmission system comprising:
a magnetic coupling device includes:
  a power transmitting coil and a power receiving coil magnetically coupled to each other;
  a signal transmitting coil and a signal receiving coil magnetically coupled to each other; and
  an electromagnetic shielding member disposed at a position preventing magnetic coupling between power transmitting and receiving coils and signal transmitting and receiving coils;
a power transmitting circuit that converts an input DC voltage into an AC voltage and outputs the AC voltage to the power transmitting coil;
a control circuit that controls the AC voltage output from the power transmitting circuit based on the AC signal received by the signal receiving coil;
a power receiving circuit that converts the AC voltage generated in the power receiving coil into a DC voltage; and
a signal generating circuit that generates an AC signal indicating the magnitude of the output voltage or output current from the power receiving circuit.

* * * * *